(12) United States Patent
    Ishimaru

(10) Patent No.:     US 12,604,088 B2
(45) Date of Patent:        Apr. 14, 2026

(54) IMAGE PICKUP APPARATUS CAPABLE OF CONTROLLING POWER SUPPLY, ITS CONTROL METHOD, AND STORAGE MEDIUM

(71) Applicant: CANON KABUSHIKI KAISHA, Tokyo (JP)

(72) Inventor: Satoshi Ishimaru, Kanagawa (JP)

(73) Assignee: CANON KABUSHIKI KAISHA, Tokyo (JP)

( * ) Notice:      Subject to any disclaimer, the term of this patent is extended or adjusted under 35 U.S.C. 154(b) by 55 days.

(21) Appl. No.: 18/652,863

(22) Filed:      May 2, 2024

(65) Prior Publication Data

US 2024/0397201 A1      Nov. 28, 2024

(30) Foreign Application Priority Data

May 24, 2023     (JP) ................................. 2023-085561

(51) Int. Cl.
  H04N 23/65       (2023.01)
  H04N 23/663      (2023.01)
  H04N 23/667      (2023.01)

(52) U.S. Cl.
  CPC ......... H04N 23/651 (2023.01); H04N 23/663 (2023.01); H04N 23/667 (2023.01)

(58) Field of Classification Search
  CPC .................................................. H04N 23/651
  See application file for complete search history.

(56) References Cited

U.S. PATENT DOCUMENTS

| | | | | | |
|---|---|---|---|---|---|
| 6,753,921 | B1 * | 6/2004 | Shimizu | ............... | H04N 23/651 |
| | | | | | 713/320 |
| 7,403,232 | B1 * | 7/2008 | Orlicki | .................... | G06F 1/325 |
| | | | | | 713/320 |
| 2014/0009671 | A1 * | 1/2014 | Ozone | .................. | G03B 17/566 |
| | | | | | 348/370 |
| 2017/0237902 | A1 * | 8/2017 | Watanabe | .............. | H04N 23/55 |
| | | | | | 348/372 |
| 2019/0306392 | A1 * | 10/2019 | Imamura | ................ | H04N 23/65 |
| 2020/0007724 | A1 * | 1/2020 | Nakagawara | .......... | H04N 23/55 |
| 2022/0345639 | A1 * | 10/2022 | Miyazaki | ............. | H04N 23/661 |
| 2022/0353408 | A1 * | 11/2022 | Gouji | ................... | H04N 23/633 |
| 2025/0314952 | A1 * | 10/2025 | Sugimoto | ............ | H04N 23/667 |

FOREIGN PATENT DOCUMENTS

JP         2022188367 A     12/2022

* cited by examiner

*Primary Examiner* — Cynthia Calderon
(74) *Attorney, Agent, or Firm* — Cowan, Liebowitz & Latman, P.C.

(57)                ABSTRACT

An image pickup apparatus is attachable to and detachable from an accessory and configured to set a first mode, and a second mode that consumes power less than that of the first mode. The image pickup apparatus includes a memory storing instructions, and a processor configured to execute the instructions to control the accessory by communicating with the accessory, limit power supply to the accessory in a case where the accessory is in a first state in which the accessory is operated by the power supplied from the image pickup apparatus and the image pickup apparatus is set to the second mode, and lift a limitation on the power supply to the accessory in a case where the processor determines that a specific condition is satisfied.

14 Claims, 15 Drawing Sheets

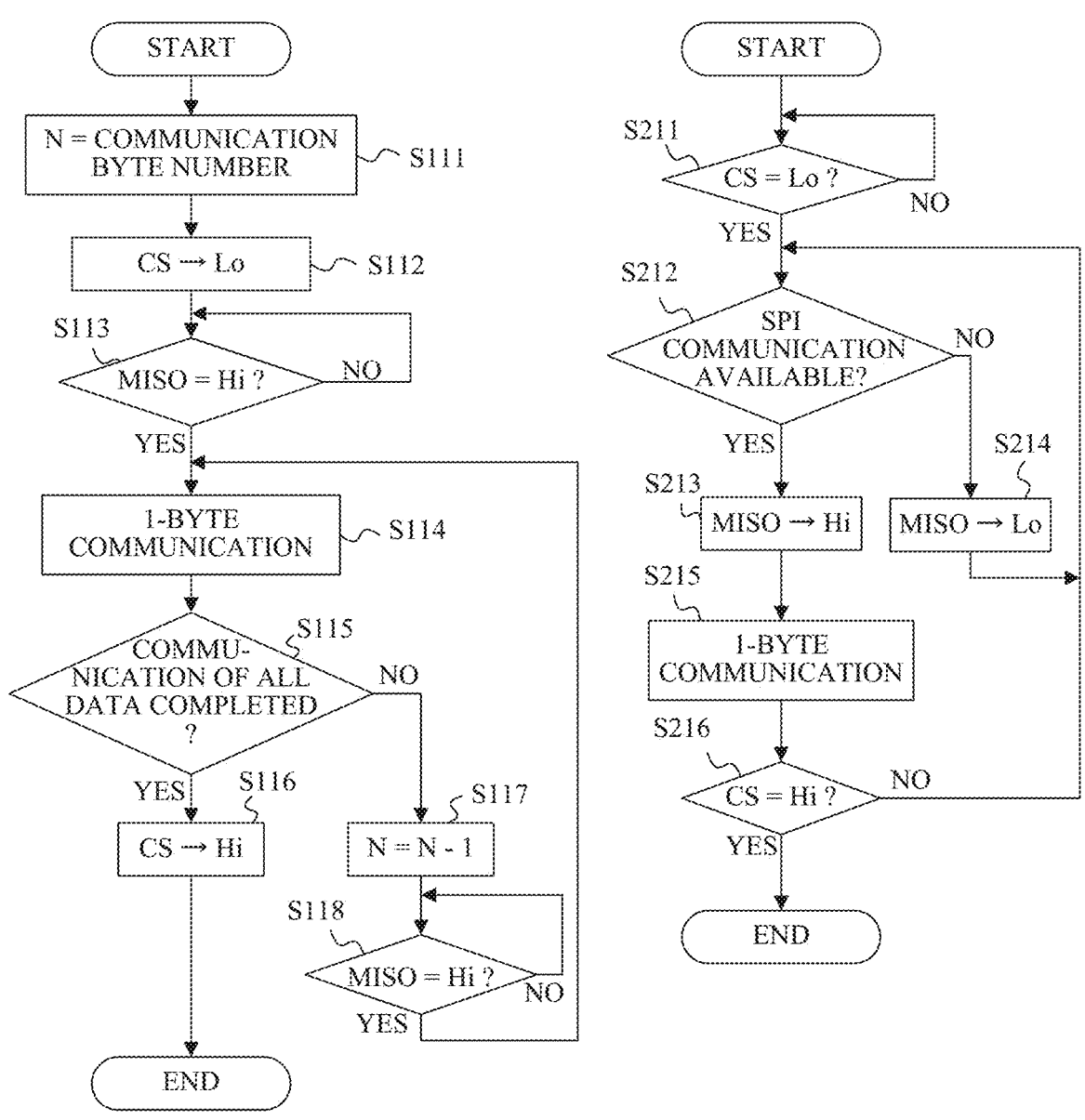
FIG. 2E           FIG. 2F

| | 1ST BYTE | 2ND BYTE | 3RD BYTE | | (N-2)TH BYTE | (N-1)TH BYTE | NTH BYTE |
|---|---|---|---|---|---|---|---|
| MOSI DATA | CMD | MOSI_DATA1 | MOSI_DATA2 | ... | MOSI_DATA[N-3] | CheckSum_C | 0x00 |
| MISO DATA | 0xA5 | CMD | MISO_DATA1 | ... | MISO_DATA[N-4] | 0x00 | CheckSum_A |

FIG. 3

| ADDRESS | D7 | D6 | D5 | D4 | D3 | D2 | D1 | D0 |
|---|---|---|---|---|---|---|---|---|
| 0x00 | ACC TYPE | | | | | | | |
| 0x01 | ACC ID NO. | | | | | | | |
| 0x02 | FIRMWARE VER. | | | | | | | |
| 0x03 | POWER SUPPLY DURING POWER-OFF | | POWER SUPPLY DURING AUTOMATIC POWER-OFF | | POWER SUPPLY SPECIFICATION | | CHARGEABILITY | |
| 0x04 | REQUEST POWER | | | | | | | |
| 0x05 | FIRMWARE UPDATE MODE | FIRMWARE UPDATE FUNCTION | INTERMEDIATE ACCESSORY OPERATION PERMISSION | | INTERMEDIATE ACCESSORY CONFIRMATION AT START | | I2C COMMAND COMMUNICATION AVAILABILITY | |
| 0x06 | RESERVE | | COMMUNICATION REQUEST FACTOR ACQUIRING METHOD | | FUNCTIONAL SIGNAL 4 | FUNCTIONAL SIGNAL 3 | FUNCTIONAL SIGNAL 2 | FUNCTIONAL SIGNAL 1 |
| 0x07 | RESERVE | | | | | | | |
| 0x08 | RESERVE | | | | | | | |
| 0x09 | RESERVE | | | | | | | |
| 0x0A | SILENT START | COMMUNICATION REQUEST FACTOR | | | | | | |
| 0x0B | RESERVE | | | | | | | |
| 0x0C | RESERVE | | | | | | SPI PROTOCOL | CS LOGIC |
| 0x0D | COMMUNICATION INTERVAL BETWEEN SPI BYTES | | | | | | | |
| 0x0E | COMMUNICATION INTERVAL BETWEEN SPI BYTES (IN FIRMWARE UPDATE MODE) | | | | | | | |
| 0x0F | CHECKSUM | | | | | | | |

FIG. 4

| NO. | TYPE |
|---|---|
| 0x00 | RESERVE |
| 0x01 | RESERVE |
| : | : |
| 0x80 | RESERVE |
| 0x81 | STROBE |
| 0x82 | INTERFACE CONVERSION ADAPTER |
| 0x83 | MICROPHONE |
| 0x84 | MULTI-ACCESSORY CONNECTION ADAPTER |
| 0x85 | RESERVE |
| 0x86 | RESERVE |
| 0x87 | RESERVE |
| 0x88 | RESERVE |
| 0x89 | RESERVE |
| 0x90 | RESERVE |
| : | : |
| 0xFF | RESERVE |

FIG. 6

| FACTOR NO. | FACTOR CONTENT |
|---|---|
| 0x00 | PRESS OF MENU CALL SW |
| 0x01 | VOICE STABILIZATION COMPLETION |
| 0x02 | VOICE UNMUTE |
| 0x03 | |
| 0x04 | |
| 0x05 | |
| 0x06 | |
| 0x07 | |
| : | |
| 0x79 | |
| 0x7A | |
| 0x7B | |
| 0x7C | |
| 0x7D | |
| 0x7E | |
| 0x7F | |

FIG. 7

| | COMMUNICATION INTERVAL |
|---|---|
| 0 | 1us |
| 1 | 2us |
| 2 | 5us |
| 3 | 10us |
| 4 | 15us |
| 5 | 25us |
| 6 | 50us |
| 7 | 100us |

FIG. 8A

| | COMMUNICATION INTERVAL |
|---|---|
| 0 | 1ms |
| 1 | 2ms |
| 2 | 5ms |
| 3 | 10ms |
| 4 | 20ms |
| 5 | 50ms |
| 6 | 80ms |
| 7 | 100ms |

FIG. 8B

IMAGE PICKUP APPARATUS CAPABLE OF CONTROLLING POWER SUPPLY, ITS CONTROL METHOD, AND STORAGE MEDIUM

BACKGROUND

Technical Field

One of the aspects of the embodiments relates to an image pickup apparatus, its control method, and a storage medium.

Description of Related Art

Recent image pickup apparatuses tend to consume more power. Japanese Patent Laid-Open No. 2022-188367 discloses a method of stopping supplying power to an accessory in a case where an image pickup apparatus cannot supply power to the accessory due to insufficient power supply capability of the image pickup apparatus.

However, Japanese Patent Laid-Open No. 2022-188367 is silent about the condition and timing for resuming power supply to the accessory after the image pickup apparatus stops supplying power to the accessory. Therefore, this prior art reference cannot improve user convenience while preventing system failure caused by power shortages.

SUMMARY

An image pickup apparatus according to one aspect of the disclosure is attachable to and detachable from an accessory and configured to set a first mode, and a second mode that consumes power less than that of the first mode. The image pickup apparatus includes a memory storing instructions, and a processor configured to execute the instructions to control the accessory by communicating with the accessory, limit power supply to the accessory in a case where the accessory is in a first state in which the accessory is operated by the power supplied from the image pickup apparatus and the image pickup apparatus is set to the second mode, and lift a limitation on the power supply to the accessory in a case where the processor determines that a specific condition is satisfied. A control method of the above image pickup apparatus and a storage medium storing a program that causes a computer to execute the control method also constitute another aspect of the disclosure.

Further features of various embodiments of the disclosure will become apparent from the following description of embodiments with reference to the attached drawings.

BRIEF DESCRIPTION OF THE DRAWINGS

FIG. 2E is a flowchart illustrating an operation of the camera control circuit B in the SPI protocol B according to the first embodiment.

FIG. 2F is a flowchart illustrating an operation of the accessory control circuit in the SPI protocol B according to the first embodiment.

FIG. 3 explains SPI communication contents according to the first embodiment.

FIG. 4 explains accessory information according to the first embodiment.

FIG. 6 explains accessory type information according to the first embodiment.

FIG. 7 explains a factor number and a factor content of a communication request according to the first embodiment.

FIGS. 8A and 8B explain communication data interval information in SPI communication according to the first embodiment.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
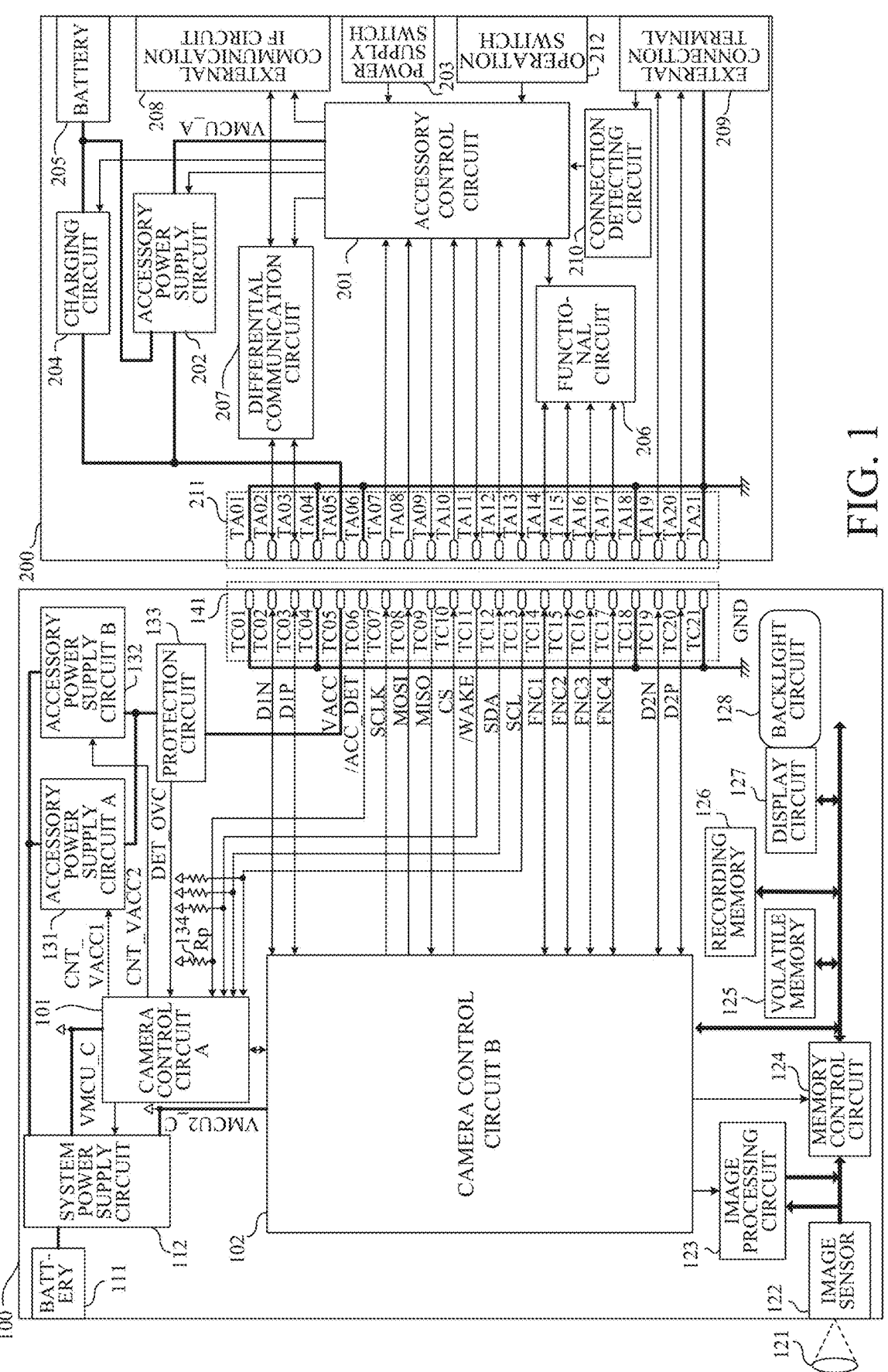
FIG. 1 is a configuration diagram of a camera system according to a first embodiment.

Referring now to FIG. 1, a description will be given of a camera system (image pickup system) 10 according to a first embodiment. FIG. 1 is a configuration diagram of the camera system 10. The camera system 10 includes a camera (image pickup apparatus) 100 as an electronic apparatus and an accessory 200 detachably attached to the camera 100. The camera 100 and the accessory 200 are electrically connected via one-to-one contacts between a plurality of contacts (terminals) TC01 to TC21 of a camera connector 141 of the camera 100 and a plurality of contacts TA01 to TA21 of an accessory connector 211 of the accessory 200, respectively.

The camera 100 is supplied with power from a battery (power source) 111. The battery 111 is attachable to and detachable from the camera 100. A camera control circuit A 101 (first control unit) and a camera control circuit B 102 (second control unit) as control units of the camera 100 are circuits that control the entire camera 100, and include a processor (microcomputer) that includes a CPU etc. The camera control circuit A101 monitors a switch or the like for unillustrated camera operations. The camera control circuit A101 operates even in a case where the camera 100 is in the standby state (low power consumption mode), and controls a system power supply and the like in accordance with an operation of the user. The camera control circuit B 102 is responsible for controlling an image sensor 122, a display circuit (display unit) 127, and the like, and the camera 100 is stopped in a case where the camera 100 is in the standby state (low power consumption mode).

A system power supply circuit 112 is a circuit that generates power to be supplied to each circuit in the camera 100, and includes a DC/DC converter circuit, Low Drop Out (LDO), a charge pump circuit, and the like. A voltage of 1.8 V that is generated by the system power supply circuit 112 that receives power from the battery 111 is constantly supplied as camera microcomputer power supply VMCU_C to the camera control circuit A101. Several types of voltages that are generated by the system power supply circuit 112 are supplied as camera microcomputer power supply VMCU2_C to the camera control circuit B 102 at an arbitrary timing. The camera control circuit A 101 controls turning on and off of the power supply to each circuit in the camera 100 by controlling the system power supply circuit 112.

An optical lens (lens apparatus) 121 is attachable to and detachable from the camera 100. Light from an object incident through the optical lens 121 is imaged on the image sensor 122, such as a CMOS sensor and a CCD sensor. The optical lens 121 and the camera 100 may be integrated. An object image formed on the image sensor 122 is encoded into a digital imaging signal. An image processing circuit 123 performs image processing such as noise reduction processing and white balance processing for the digital imaging signal to generate image data, and converts the image data into an image file in a JPEG format or the like in order to record the image data in a recording memory 126. The image processing circuit 123 generates from the image data VRAM image data to be displayed on the display circuit 127. A conversion into another voltage may be used.

A memory control circuit 124 controls transmissions and receptions of image data and other data generated by the image processing circuit 123 and the like. A volatile memory 125 is a memory capable of high-speed reading and writing such as DDR3SDRAM, and is used as a workspace for image processing that is performed by the image processing circuit 123. The recording memory 126 is a readable and writable recording medium such as an SD card or a CFexpress card that is attachable to and detachable from the camera 100 via an unillustrated connector. The display circuit 127 is a display disposed on a back surface of the camera 100, and includes an LCD panel, an organic EL display panel, and the like. A backlight circuit 128 adjusts the brightness of the display circuit 127 by changing the light amount of the backlight of the display circuit 127.

Each of a power supply circuit A for the accessory (accessory power supply circuit A hereinafter) 131 and a power supply circuit B for the accessory (accessory power supply circuit B hereinafter) 132 serves as a power supply unit, is a voltage conversion circuit that converts voltage supplied from the system power supply circuit 112 into predetermined voltage, and generates 3.3 V as accessory power supply VACC in this embodiment. The accessory power supply circuit A 131 is a power supply circuit that includes LDO or the like and has a low self-power consumption. The accessory power supply circuit B 132 includes a DC/DC converter circuit or the like, and can pass current larger than that of the accessory power supply circuit A 131. The consumed power (second power) of the accessory power supply circuit B 132 is larger than the consumed power (first power) of the accessory power supply circuit A 131. Therefore, in a case where a load current is small, the accessory power supply circuit A 131 is more efficient than the accessory power supply circuit B 132, and in a case where the load current is large, the accessory power supply circuit B 132 is more efficient than the accessory power supply circuit A 131. The camera control circuit A 101 controls turning on and off of voltage outputs of the accessory power supply circuits A 131 and B 132 according to the operation state of the accessory 200.

A protection circuit 133 as a projection unit includes a current fuse element, an electronic fuse circuit in which a poly-switch element or a resistor, an amplifier, and a switching element are combined, or the like. The protection circuit 133 outputs overcurrent detecting signal DET_OVC when power supply current values supplied to the accessory 200 from the accessory power supply circuits A 131 and B 132 are higher than a predetermined value and become excessive (abnormal). In this embodiment, the protection circuit 133 is the electronic fuse circuit, and notifies the camera control circuit A 101 of the overcurrent detecting signal DET_OVC when a current of 1 A or more flows. The overcurrent detecting signal DET_OVC indicates the overcurrent by becoming at a high level. The predetermined value may be different from 1 A.

The camera connector 141 is a connector for an electrical connection with the accessory 200 via 21 contacts TC01 to TC21 that are arranged in a row. The contacts TC01 to TC21 are arranged in this order from one end to the other end in this arrangement direction.

The contact TC01 is connected to the ground (GND) and serves not only as a reference potential contact but also as a contact for controlling wiring impedances of the differential signals D1N and D1P. The contact TC01 corresponds to a third ground contact. The differential signal D1N that is connected to the contact TC02 and the differential signal D1P that is connected to the contact TC03 are differential data communication signals that perform data communications in pairs, and are connected to the camera control circuit B 102. The contacts TC02, TC03, TC07 to TC17 described below, TC19 and TC20 are communication contacts.

The contact TC04 as a first ground contact is connected to GND and serves as a reference potential contact for the camera 100 and the accessory 200. The contact TC04 is disposed outside the contact TC05 described below in the contact arrangement direction. The accessory power supply VACC generated by the accessory power supply circuits A 131 and B 132 is connected to the contact TC05 as a power supply contact via the protection circuit 133.

An accessory attachment detecting signal /ACC_DET is connected to the contact TC06 as an attachment detecting contact. The accessory attachment detecting signal /ACC_ DET is pulled up to the camera microcomputer power supply VMCU_C via a resistor element Rp 134 (10 kΩ). The camera control circuit A 101 can detect whether or not the accessory 200 is attached by reading a signal level of the accessory attachment detecting signal /ACC_DET. If the signal level (potential) of the accessory attachment detecting signal /ACC_DET is high (predetermined potential), it is detected that the accessory 200 is not attached, and if it is a low level (GND potential as described below), it is detected that the accessory 200 is attached.

Changing the signal level (potential) of the accessory attachment detecting signal /ACC_DET from the high level (Hi) to the low level (Lo) in a case where the camera 100 is powered on triggers various transmissions between the camera 100 and the accessory 200 via contacts.

The camera control circuit A101 supplies power to the accessory 200 via TC05 as the power supply contact in response to detecting the attachment of the accessory 200.

SCLK connected to the communication contact TC07, MOSI connected to a contact TC08, MISO connected to the contact TC09, and Chip Select (CS) connected to the contact TC10 are signals for Serial Peripheral Interface (SPI) communication in which the camera control circuit B 102 becomes a communication master. In this embodiment, the SPI communication has a communication clock frequency of 1 MHz, a data length of 8 bits (1 byte), and a bit order of MSB first, and a full-duplex communication method.

Figures 2A, 2B:
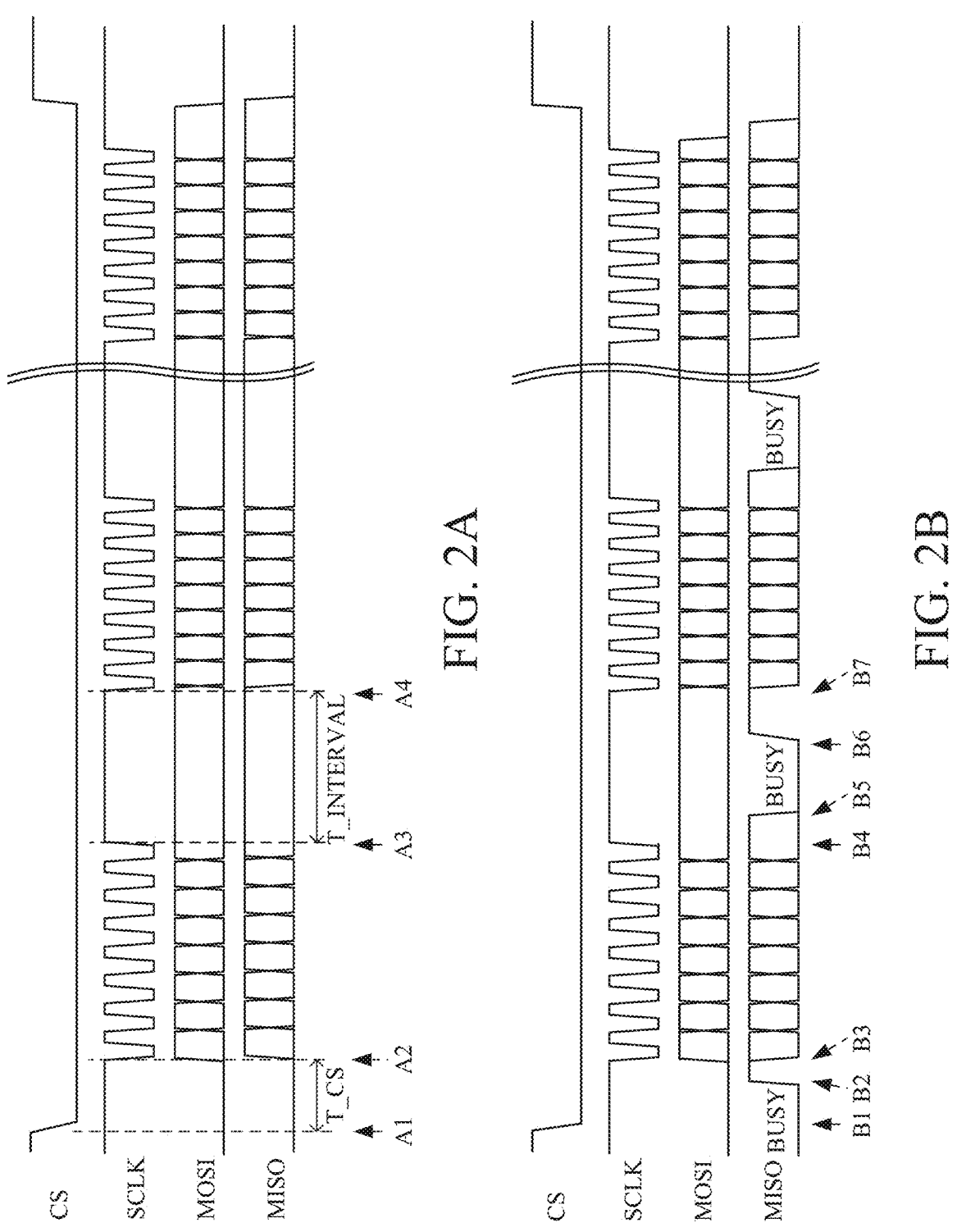
FIG. 2A is a schematic diagram of a communication waveform of SPI protocol A according to the first embodiment.
FIG. 2B is a schematic diagram of a communication waveform of SPI protocol B according to the first embodiment.

In this embodiment, the camera 100 and the accessory 200 can support two types of communication protocols (control methods) for the SPI communication method. The first communication protocol (first control method) is a method that does not confirm whether the accessory 200 is in a communicable state (communicability state of the accessory 200 or whether or not the accessory 200 is communicable) before the camera 100 outputs SCLK, and will be referred to as SPI protocol A in this embodiment. FIG. 2A is a schematic diagram of a communication waveform of the SPI protocol A. In FIG. 2A, a CS signal is low-active.

The camera control circuit B 102 changes CS into a low level at timing A1 and requests the accessory control circuit (control unit) 201 for the SPI communication. At timing A2 predetermined time T_CS after the timing A1, the camera control circuit B 102 starts outputting SCLK and MOSI. Similarly, when the accessory control circuit 201 detects a trailing edge of SCLK, the accessory control circuit 201 starts outputting MISO. The camera control circuit B 102 stops outputting SCLK at timing A3 when completing outputting 1-byte SCLK. The camera control circuit B 102 stops outputting SCLK at the timing A3 for predetermined time T_INTERVAL, resumes the output of SCLK at timing A4 after the T_INTERVAL has elapsed, and performs the next 1-byte communication.

Figures 2C, 2D:
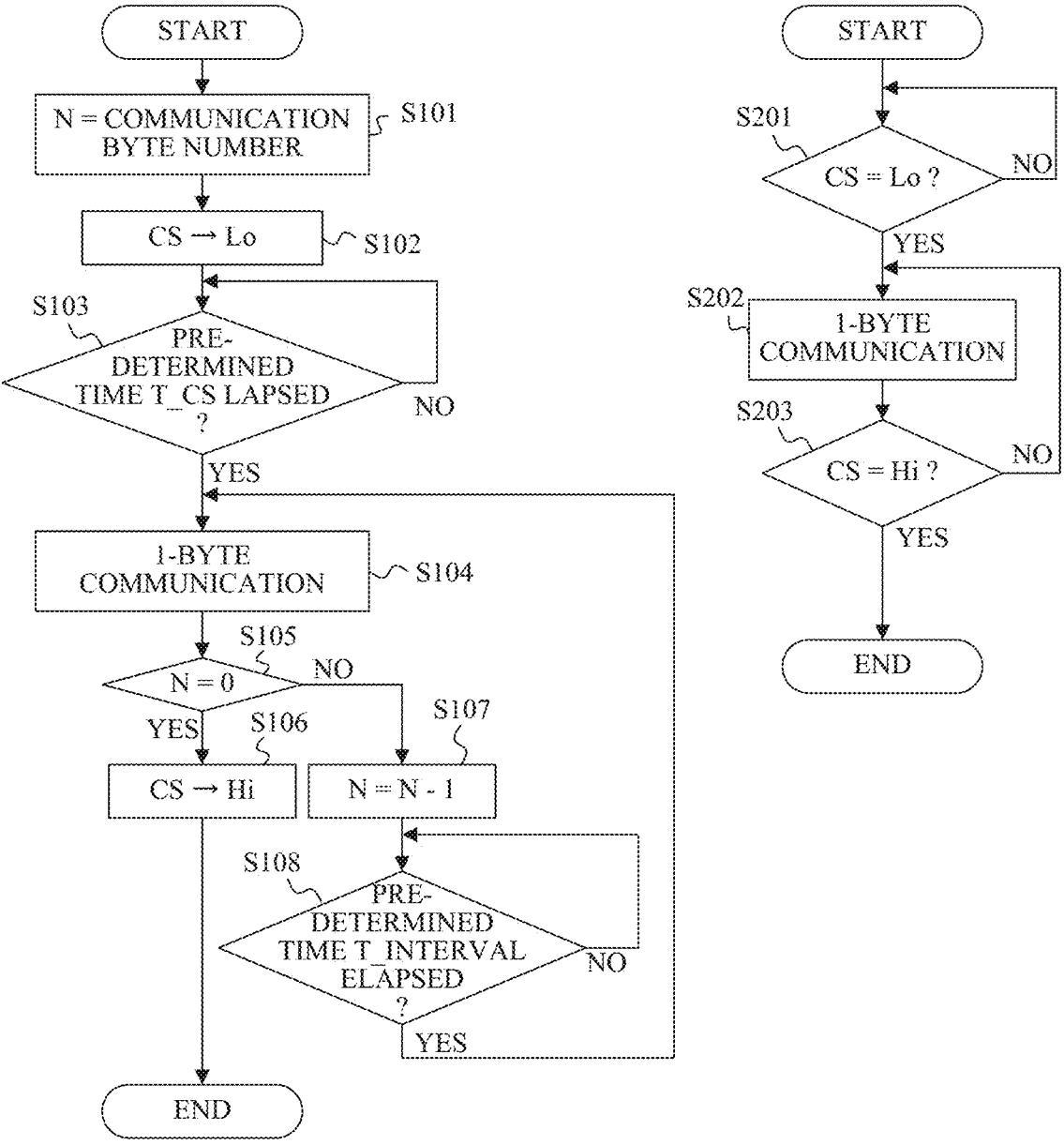
FIG. 2C is a flowchart illustrating an operation of a camera control circuit B in the SPI protocol A according to the first embodiment.
FIG. 2D is a flowchart illustrating an operation of an accessory control circuit in the SPI protocol A according to the first embodiment.

FIG. 2C is a flowchart illustrating an operation of the camera control circuit B102 in the SPI protocol A. In step S101, the camera control circuit B 102 stores a numerical value indicating the number of bytes to be communicated in internal variable N. For example, 3 is stored in a case of 3-byte communication. Next, in step S102, the camera control circuit B 102 changes CS to a low level and requests for SPI communication. In step S103, the camera control circuit B 102 performs wait processing until predetermined time T_CS elapses after CS is changed to the low level. After the predetermined time T_CS elapses, the flow proceeds to step S104.

In step S104, the camera control circuit B 102 controls an SCLK output, a MOSI data output, and a MISO data input and performs 1-byte data communication. Next, in step S105, the camera control circuit B102 determines whether the internal variable N indicating the number of communication bytes is 0. In the case where the internal variable N is 0, the flow proceeds to step S106. On the other hand, in the case where the internal variable Nis other than 0, the flow proceeds to step S107.

In step S107, the camera control circuit B 102 stores as new internal variable N a value obtained by decrementing the numerical value of the internal variable N indicating the number of communication bytes by 1. Next, in step S108, the camera control circuit B 102 performs wait processing until the predetermined time T_INTERVAL elapses after the 1-byte data communication in step S104 is completed. Then, after the predetermined time T_INTERVAL elapses, the flow returns to the processing in step S104, and the camera control circuit B 102 executes the same processing again. In step S106, the camera control circuit B 102 changes CS to a high level and ends a series of SPI communication.

FIG. 2D illustrates an operation of the accessory control circuit 201 in the SPI protocol A. In step S201, the accessory control circuit 201 determines whether or not CS has changed to a low level. In the case where CS has changed to the low level, the flow proceeds to step S202, and in the case where CS has not changed to the low level, the flow returns to step S211.

In step S202, the accessory control circuit 201 performs the 1-byte data communication by the MOSI data input control and MISO data output control in response to the SCLK signal input. Next, in step S203, the accessory control circuit 201 determines whether or not CS has changed to a high level. In the case where the CS has changed to the high level, the accessory control circuit 201 determines that the SPI communication has been completed. In the case where the CS has not changed to the high level, the flow returns to step S202 so that the accessory control circuit 201 performs the next 1-byte communication.

The second communication protocol (second control method) is a method of confirming whether the accessory 200 is in a communicable state (communicability state of the accessory 200) before the camera 100 outputs SCLK and will be referred to as SPI protocol B in this embodiment. FIG. 2B is a schematic diagram of a communication waveform of the SPI protocol B. At timing B1, the camera control circuit B102 changes CS to a low level and requests the accessory control circuit 201 for SPI communication. The camera control circuit B102 confirms the potential of MISO together with the communication request. When the potential of MISO is a high level, the camera control circuit B102 determines that the accessory control circuit 201 is in a communicable state. On the other hand, when the potential of MISO is a low level, the camera control circuit B102 determines that the accessory control circuit 201 is in an incommunicable state.

On the other hand, when the accessory control circuit 201 detects a trailing edge of CS, the accessory control circuit 201 performs control for changing MISO to a high level if the SPI communication is available, and performs control for changing MISO to a low level if the communication is unavailable (B2).

When the camera control circuit B 102 confirms that MISO is at a high level at timing B3, the camera control circuit B 102 starts outputting SCLK and MOSI. The accessory control circuit 201 starts outputting MISO when detecting a trailing edge of SCLK. The camera control circuit B 102 stops outputting SCLK when the 1-byte SCLK output is completed at timing B4.

After the 1-byte communication, the accessory control circuit 201 performs control for changing MISO to a high level if the SPI communication is available, and control for changing MISO to a low level if the SPI communication is unavailable (B5, B6). The camera control circuit B 102 confirms the potential of MISO at timing B7. If MISO is at a high level, it is determined that the accessory control circuit 201 is in a communicable state, and if MISO is at a low level, it is determined that the accessory control circuit 201 is in an incommunicable state.

FIG. 2E is a flowchart illustrating processing of the camera control circuit B 102 in the SPI protocol B. In step S111, the camera control circuit B 102 stores a numerical value indicating the number of bytes to be communicated in the internal variable N. For example, 3 is stored in the case of 3-byte communication. Next, in step S112, the camera control circuit B 102 changes CS to a low level and requests SPI communication. Next, in step S113, the camera control circuit B 102 determines whether MISO has changed to a high level. In the case where MISO is at the high level, the flow proceeds to step S114, and in the case where MISO has not yet at the high level, the flow returns to step S113.

In step S114, the camera control circuit B 102 controls an SCLK output, a MOSI data output, and a MISO data input so as to perform 1-byte data communication. Next, in step S115, the camera control circuit B 102 determines whether or not the internal variable N indicating the number of communication bytes is 0. In the case where the internal variable N is 0, the flow proceeds to step S116, and in the case where the internal variable N is other than 0, the flow proceeds to step S117.

In step S117, the camera control circuit B 102 stores as new internal variable N a value obtained by decrementing the numerical value of the internal variable N indicating the number of communication bytes by 1. Next, in step S118, the camera control circuit B 102 determines whether or not MISO has changed to a high level. In the case where MISO is at the high level, the flow proceeds to step S114, and in the case where MISO has not yet been at the high level, the flow returns to step S118. In step S116, the camera control circuit B 102 changes CS to a high level and ends a series of SPI communications.

FIG. 2F is a flowchart illustrating an operation of the accessory control circuit 201 in the SPI protocol B. In step S211, the accessory control circuit 201 determines whether or not CS has changed to a low level. In the case where CS has changed to the low level, the flow proceeds to step S212, and in the case where CS has not yet changed to the low level, the flow returns to step S211.

In step S212, the accessory control circuit 201 determines whether or not the SPI communication is available. In the case where the SPI communication is available, the flow proceeds to step S213, and in the case where the SPI communication is unavailable, the flow proceeds to step S214. In step S213, the accessory control circuit 201 performs control for changing MISO to a high level and the flow proceeds to step S215. In step S214, the accessory control circuit 201 performs control for changing MISO to a low level and the flow returns to step S212.

In step S215, the accessory control circuit 201 controls a MOSI data input and a MISO data output in response to the SCLK signal input and performs 1-byte data communication. Next, in step S216, the accessory control circuit 201 determines whether or not CS has changed to a high level. In the case where CS has changed to the high level, it is determined that the SPI communication has been completed, and in the case where CS has not changed to the high level, the flow returns to step S212 so as to perform the next 1-byte communication.

FIG. 3 explains communication contents in notifying an operation execution instruction (command) from the camera 100 to the accessory 200 by the SPI communication in this embodiment. The camera control circuit B 102 transmits as MOSI data information CMD indicating a command number to the accessory control circuit 201 in the first-byte communication. The accessory control circuit 201 transmits as MISO data a value of 0xA5, which is information indicating the communicable state. In the case where the first-byte communication processing cannot be executed, the accessory control circuit 201 transmits as MISO data a value other than 0xA5.

The camera control circuit B 102 transmits argument MOSI_DATA1 corresponding to the command number CMD in the second-byte communication. From the third byte to the (N−2)th byte, the camera control circuit B 102 similarly transmits the arguments MOSI_DATA2 to MOSI_DATA [N−3] corresponding to the command number CMD.

The accessory control circuit 201 transmits as MISO data the command number CMD received in the first byte to the camera control circuit B 102 in the second-byte communication. This configuration enables the camera control circuit B 102 to determine that the accessory control circuit 201 has correctly received the MOSI data.

The accessory control circuit 201 transmits, as MISO data, return value MISO_DATA1 corresponding to the command number CMD in the third-byte communication. From the fourth byte to the (N−2)th byte, the accessory control circuit 201 similarly transmits arguments MISO_DATA2 to MISO_DATA [N−4] corresponding to the command number CMD. Assume that the number of arguments and the number of return values are previously determined for each command number. One or both of the argument and the return value may be omitted.

The camera control circuit B 102 transmits checksum data CheckSum_C as MOSI data to the accessory control circuit 201 in the (N−1)th byte communication. The checksum data CheckSum_C is a value calculated by the following expression (1).

$$CheckSum\_C = \tag{1}$$
$$EXOR\,(\text{AND}\,(\text{SUM}\,(CMD, MOSI\_DATA1, \ldots, MOSI\_DATA[N-3]),$$
$$0xFF), 0xFF)$$

The accessory control circuit 201 transmits 0x00 as MISO data.

The camera control circuit B 102 transmits 0x00 as MOSI data in the Nth-byte communication. The accessory control circuit 201 transmits checksum data CheckSum_A as MISO data. The checksum data CheckSum_A is calculated by the following expression (2) or (3).

In the case where the value of CheckSum_C received by the camera control circuit B 102 in the (N−1)th-byte communication and the value of CheckSum_C calculated by the camera control circuit B 102 accord with each other, Check-Sum_A is calculated by the expression (2).

$$\text{CheckSum\_A} = EXOR \qquad (2)$$
$$(\text{AND (SUM}(0x45, CMD, \text{MIS0\_DATA1}, \ldots, \text{MOSI\_DATA}[N-4]),$$
$$0xFF), 0xFF)$$

In the case where the value of CheckSum_C received by the camera control circuit B 102 in the (N−1)th-byte communication and the value of CheckSum_C calculated by the camera control circuit B 102 do not accord with each other, CheckSum_A is calculated by the expression (3).

$$\text{CheckSum\_A} = (\text{AND} \qquad (3)$$
$$(\text{SUM }(0x45, CMD, \text{MIS0\_DATA1}, \ldots, \text{MOSI\_DATA}[N-4]), 0xFF)$$

The contact TC11 is connected with a communication request signal /WAKE for requesting communication from the accessory 200 to the camera control circuit A 101. The communication request signal /WAKE is pulled up to the camera microcomputer power supply VMCU_C via a resistor. The camera control circuit A 101 can receive a communication request from the accessory 200 by detecting a trailing edge in the communication request signal /WAKE.

SDA connected to the contact TC12 and SCL connected to the contact TC13 are signals for performing Inter-Integrated Circuit (I2C) communication in which the camera control circuit A 101 is a communication master. SDA and SCL are open-drain communications pulled up by the camera microcomputer power supply VMCU_C, and have communication frequencies of 100 kbps in this embodiment.

FIG. 4 explains accessory information that the accessory 200 has in an unillustrated nonvolatile memory. As illustrated in FIG. 4, the accessory information is mapped in the memory space at addresses 0x00 to 0x0F, and the accessory information can be read out of the accessory 200 by the I2C communication. In the I2C communication according to this embodiment, a checksum value for read data is added as the final data of the communication. Details of the accessory information will be described below.

An FNC1 signal connected to the contact TC14, an FNC2 signal connected to the contact TC15, an FNC3 signal connected to the contact TC16, and an FNC4 signal connected to the contact TC17 are functional signals whose function is variable according to the type of the attached accessory 200. For example, in the case where the accessory 200 is a microphone device, a signal communicated via TC15 is a voice data signal, and in the case where the accessory 200 is an illumination device (strobe device), a signal communicated via TC 14 is a signal that notifies the light emission timing.

The contact TC18 as a second ground contact is also connected to GND, and is a contact that serves as a reference potential for the camera 100 and the accessory 200, similarly to the contact TC04. A differential signal D2N connected to the contact TC19 and a differential signal D2P connected to the contact TC20 are data communication signals in which they perform data communications in pairs, and are connected to the camera control circuit B 102. For example, USB communication can be performed via TC19 and TC20. The contact TC21 is connected to GND and can be used not only as a reference potential contact but also as a contact for controlling wiring impedances of the differential signals D2N and D2P. The contact TC21 corresponds to a fourth ground contact.

The accessory 200 has a battery 205 and receives power supply from the battery 205 and also receives power supply from the camera 100 via the camera connector 141 and the accessory connector 211. The accessory control circuit 201 as a control unit of the accessory 200 is a circuit that controls the entire accessory 200, and includes a processor (microcomputer) that includes a CPU etc.

The accessory power supply circuit 202 is a circuit that generates a power supply for supplying power to each circuit in the accessory 200, and includes a DC/DC converter circuit, LDO, a charge pump circuit, and the like. A voltage of 1.8V generated by the accessory power supply circuit 202 is constantly supplied as accessory microcomputer power supply VMCU_A to the accessory control circuit 201. The voltage generated by the accessory power supply circuit 202 may be different from 1.8V. Control over the accessory power supply circuit 202 can provide turning-on and off control over the power supply to each circuit in the accessory 200.

A charging circuit 204 is a circuit for charging the battery 205 using the power supplied from the camera 100. The accessory control circuit 201 controls the charging circuit 204 to charge the battery 205 in the case where the accessory control circuit 201 can determine that sufficient power is supplied from the camera 100 to perform a charging operation. In this embodiment, the battery 205 is attached to the accessory 200, but the accessory 200 may be operated only by a power supply from the camera 100 without attaching the battery 205. In this case, the charging circuit 204 is unnecessary.

A differential communication circuit 207 is a circuit for performing differential communication with the camera 100, and can communicate data with the camera 100. An external communication IF circuit 208 is an IF circuit for performing data communication with an unillustrated external device, such as an Ethernet communication IF, a wireless LAN communication IF, and a public network communication IF.

The accessory control circuit 201 controls the differential communication circuit 207 and the external communication IF circuit 208 to transmit data received from the camera 100 to the external device and data received from the external device to the camera 100. The functional circuit 206 is a circuit having different functions depending on the type of the accessory 200. The functional circuit 206 is, for example, a light-emitting circuit, a charging circuit, or the like in the case where the accessory 200 is a strobe device. In the case where the accessory 200 is a microphone device, it is a voice codec circuit, a microphone circuit, or the like.

An external connection terminal 209 is a connector terminal for connection to an external device, and is a USB TYPE-C connector in this embodiment. A connection detecting circuit 210 is a circuit for detecting that an external device has been connected to the external connection terminal 209. The accessory control circuit 201 can detect the connection of the external device to the external connection terminal 209 by receiving an output signal of the connection detecting circuit 210.

A power supply switch 203 is a switch for turning on and off the operation of the accessory 200. The accessory control circuit 201 can detect a turning-on position and a turning-off position by reading a signal level of a terminal to which the power supply switch 203 is connected.

An operation switch 212 is a switch for operating the accessory 200 and includes a button, a cross key, a slide switch, a dial switch, and the like. When the operation switch 212 is operated, the accessory control circuit 201 detects the operation and executes predetermined processing according to the operation.

An accessory connector 211 is a connector electrically connectable to the camera 100 via 21 contacts TA01 to TA21 that are arranged in a row. The contacts TA01 to TA21 are arranged in this order from one end to the other end in the arrangement direction.

The contact TA01 is connected to GND and serves not only as a reference potential contact but also as a contact for controlling wiring impedances of the differential signals D1N and D1P. The contact TA01 corresponds to a third ground contact.

The differential signal D1N connected to the contact TA02 and the differential signal D1P connected to the contact TA03 are data communication signals in which they perform data communication in pairs, and are connected to the differential communication circuit 207. The contacts TA02, TA03, TA07 to TA17 described below, TA19 and TA20 are communication contacts.

The contact TA04 as a first ground contact is connected to GND and serves as a reference potential contact for the camera 100 and the accessory 200. The contact TA04 is disposed outside the contact TA05 described below in the arrangement direction of the contacts. The accessory power supply circuit 202 and the charging circuit 204 are connected to TA05 as a power supply contact, and the accessory power supply VACC supplied from the camera 100 is connected to the contact TA05. The contact TA06 as an attachment detecting contact is directly connected to GND. In a case where the accessory 200 is attached to the camera 100, the contact TA06 turns the accessory attachment detecting signal /ACC_DET described above to a low level (GND potential). Thereby, the camera 100 can detect the attachment of the accessory 200. SCLK connected to the contact TA07 as a communication contact, MOSI connected to the contact TA08, MISO connected to the contact TA09, and CS connected to the contact TA10 are signals for the accessory control circuit 201 to act as a communication slave to perform SPI communication.

A communication request signal /WAKE for requesting communication from the accessory control circuit 201 to the camera 100 is connected to the contact TA11. In a case where the accessory control circuit 201 determines that communication with the camera 100 is necessary, the accessory control circuit 201 requests the camera 100 for communication by changing the communication request signal /WAKE to a low output.

SDA connected to the contact TA12 and SCL connected to the contact TA13 are signals for the accessory control circuit 201 to serve as a communication slave to perform I2C communication.

An FNC1 signal connected to the contact TA14, an FNC2 signal connected to the contact TA15, an FNC3 signal connected to the contact TA16, and an FNC4 signal connected to the contact TA17 are functional signals whose functions are variable according to the type of accessory 200. For example, in the case where the accessory 200 is a microphone device, they can be voice data signals, and in the case where the accessory 200 is a strobe device, they can be signals for notifying a light emission timing.

The contact TA18 as a second ground contact is also connected to GND, and is a reference potential contact for the camera 100 and the accessory 200, similar to the contact TA04. The differential signal D2N connected to the contact TA19 and the differential signal D2P connected to the contact TA20 are data communication signals in which they perform data communication in pairs, and are connected to the external connection terminal 209. The contact TA21 is connected to GND and can be used not only as a reference potential contact but also as a terminal for controlling the wiring impedances of the differential signals D2N and D2P. TA21 corresponds to a fourth ground contact.

Figure 5:
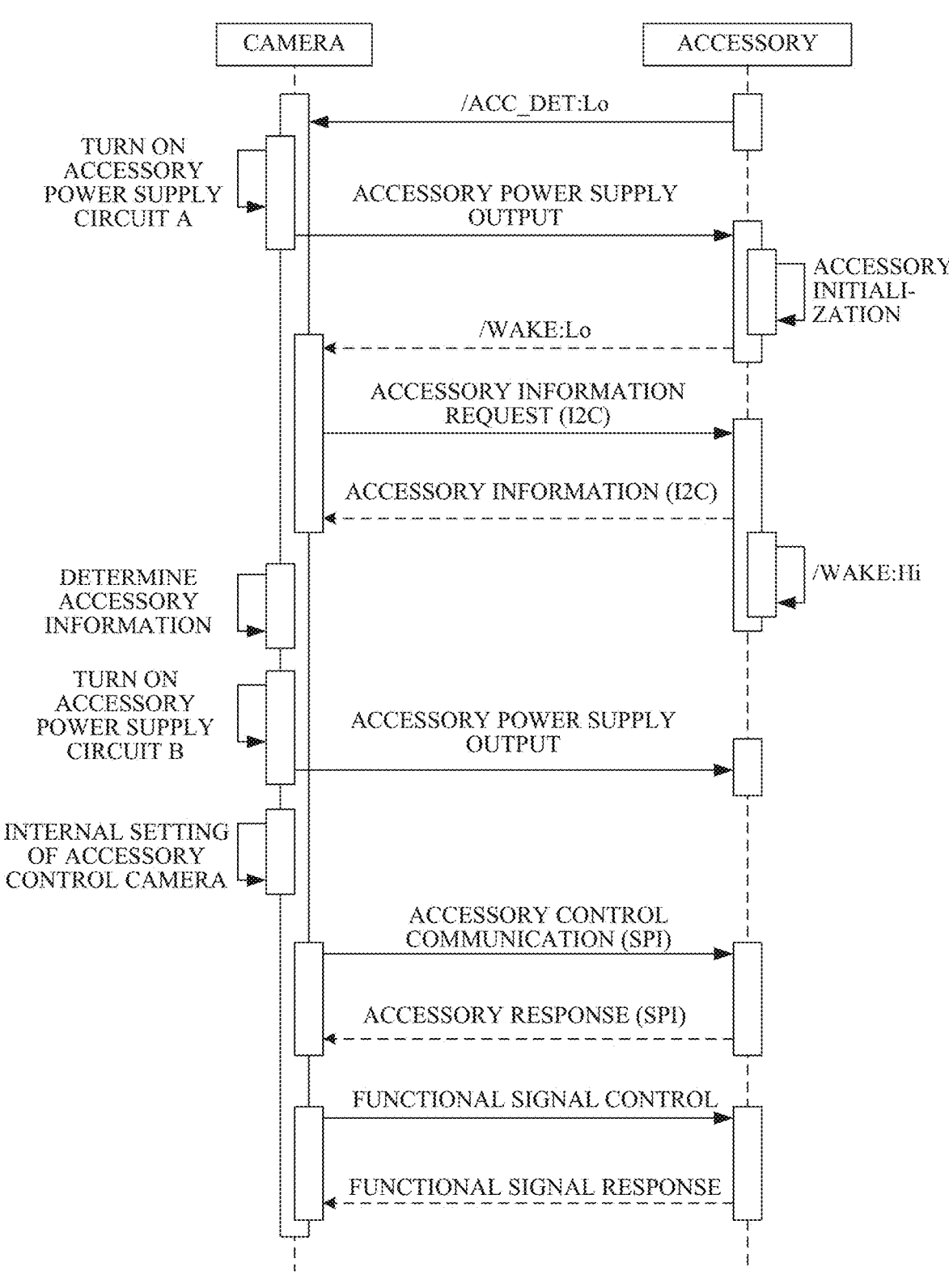
FIG. 5 is a sequence diagram illustrating operations of the camera and accessory according to the first embodiment.

FIG. 5 illustrates operations (processing) of the camera 100 and the accessory 200 in a case where the accessory 200 is attached to the camera 100. A detailed description will now be given below of processing of each of the camera 100 and the accessory 200.

In a case where the accessory 200 is attached to the camera 100, the accessory attachment detecting signal /ACC_DET becomes at a GND level, and the camera control circuit A 101 determines that the accessory 200 has been attached to the camera 100. In a case where the camera control circuit A 101 determines that the accessory 200 has been attached, the camera control circuit A 101 sets power supply control signal CNT_VACC1 to a high level in order to turn on the output of the accessory power supply circuit A 131. The accessory power supply circuit A 131 outputs the accessory power supply VACC as soon as the power supply control signal CNT_VACC1 becomes at a high level.

When the accessory power supply circuit 202 receives VACC in the accessory 200, the accessory power supply circuit 202 generates the power supply VMCU_A for the accessory control circuit 201 and the accessory control circuit 201 is started. After the accessory control circuit 201 is started, the accessory control circuit 201 initializes each block in the accessory 200. Thereafter, when the accessory control circuit 201 is ready to communicate with the camera 100, the accessory control circuit 201 sets the communication request signal /WAKE to a low level.

In the camera 100, the camera control circuit A 101 detects that the accessory 200 is in a communicable state by detecting that a /WAKE terminal has become at a low level. The camera control circuit A 101 requests the accessory information by the I2C communication.

In the accessory 200, the accessory control circuit 201 transmits the accessory information in response to the accessory information request from the camera 100. The accessory control circuit 201 when transmitting the accessory information sets the communication request signal /WAKE to a high level.

In the camera 100, the camera control circuit A 101 determines whether or not the attached accessory is controllable etc. by determining the received accessory information. The camera control circuit A 101 turns on the accessory power supply circuit B 132. The camera control circuit A 101 when completing various settings for the camera 100 notifies the camera control circuit B 102 of the accessory information. The camera control circuit B 102 provides the accessory 200 with a notification of a control command and a control of a functional signal by the SPI communication based on the accessory type information. The accessory control circuit 201 responds to the control command by the SPI communication from the camera 100 and performs control in accordance with the functional signal.

A description will now be given of the accessory information illustrated in FIG. 4. D7-D0 data at address 0x00 is information indicating a type of the accessory. FIG. 6 explains accessory type information as the accessory information. For example, 0x81 indicates a strobe device, 0x82 indicates an interface conversion adapter device, 0x83 indicates a microphone device, and 0x84 indicates a multi-accessory connection adapter device for attaching a plurality of accessory devices to the camera 100.

Here, the adapter device is an intermediate accessory attached between the camera 100 and the accessory such as a strobe device and a microphone device. The interface conversion adapter device is an adapter device that converts the interface so as to provide compatibility between the camera 100 and the accessory in a case where the interface of the camera 100 and the interface of the accessory are different. The multi-accessory connection adapter device is an adapter device to which a plurality of accessories are attachable.

D7-D0 data at address 0x01 is information indicating a model number of the accessory 200. The model of the accessory can be uniquely identified by the accessory type information described above and this information. D7-D0 data at address 0x02 is information indicating a firmware version of the accessory 200.

D7-D6 data at address 0x03 is information indicating whether or not a supply of the accessory power supply VACC to the accessory 200 is to be requested while an unillustrated power supply switch of the camera 100 is turned off. In the case where the information is 0, no power supply is requested. In the case where the information is 1, a power supply is requested by the accessory power supply circuit A 131. In the case where the information is 2, a power supply is requested by the accessory power supply circuit B 132. D5-D4 data at address 0x03 is information indicating whether or not to request the accessory 200 for a supply of the accessory power supply VACC in a case where the camera 100 is in the power saving mode. In the case where the information is 0, it means that no power supply is necessary. In the case where the information is 1, it means that there is a power supply requested by the accessory power supply circuit A 131. In the case where the information is 2, it means that there is a power supply requested by the accessory power supply circuit B 132. D3-D2 data at address 0x03 is information indicating whether or not the accessory 200 has the battery 205. In the case where the information is 0, it means that the accessory 200 has no battery, and in the case where the information is 1, it means that the accessory 200 has the battery. D1-D0 data at address 0x03 is information indicating whether or not the accessory 200 has a charging function for the battery 205. In the case where the information is 0, it means that the accessory 200 has no charging function, and in the case where it is 1, it means that the accessory 200 has the charging function.

D7-D0 data at address 0x04 is information indicating required power to the accessory power supply VACC with which the accessory 200 is supplied from the camera 100. A value obtained by multiplying this information by 10 indicates a current value. In a case where this information is 10, it means 100 mA, and in a case where this information is 100, it means 1 A.

In order to reduce an information amount of this information, this information may be simply associated with an arbitrary current value. For example, in the case where this information is 0, it may mean 100 mA, in the case where this information is 1, it may mean 300 mA, in the case where this information is 3, it may mean 450 mA, and in the case where this information is 4, it may mean 600 mA.

D7 data at address 0x05 is information indicating whether or not the accessory 200 is in a firmware update mode state (information indicating the operation mode of the accessory 200). In the case where the information is 0, it means that the accessory 200 is not in the firmware update mode state, and in the case where it is 1, it means that the accessory 200 is in the firmware update mode state. D6 data at address 0x05 is information indicating whether or not the accessory 200 has a firmware update function. In the case where the information is 0, it means that the accessory 200 has no firmware update function. In the case where the information is 1, it means that the accessory 200 has the firmware update function. D5-D4 data at address 0x05 is information indicating whether or not an operation of the accessory 200 that is attached to an intermediate (connection) accessory is to be permitted (supported). In the case where the information is 0, it means that the operation is not permitted, and in the case where it is 1, it means that the operation is permitted. D3-D2 data at address 0x05 is information indicating whether or not the accessory 200 needs the camera 100 to confirm an attachment state of the intermediate accessory when the camera 100 is started. In the case where the information is 0, it means that the confirmation is unnecessary, and in the case where it is 1, it means that the confirmation is necessary. D1-D0 data at address 0x05 is information indicating whether or not the accessory 200 supports a command notification by the I2C communication. In the case where this information is 0, it means that the command notification is not supported, and in the case where it is 1, it means that the command notification is supported.

D5-D4 data at address 0x06 is information indicating a communication method that can be used to notify the camera 100 of a factor of a communication request after the accessory 200 notifies the camera 100 of communication request signal /WAKE. In the case where the information is 0, it means that the I2C communication method is supported. In the case where the information is 1, it means that the SPI communication method is supported. In the case where the information is 2, it means that both the I2C communication method and the SPI communication method are supported. D3-D0 data at address 0x06 is information indicating whether or not the accessory 200 has functions corresponding to the FNC1 signal, the FNC2 signal, the FNC3 signal, and the FNC4 signal. D0 data corresponds to the FNC1 signal, D1 data corresponds to the FNC2 signal, D2 data corresponds to the FNC3 signal, and D3 data corresponds to the FNC4 signal. In the case where the value is 0, it means that the accessory 200 does not have that function. In the case where the value is 1, the accessory 200 has that function.

D7 data at address 0x0A is information indicating whether or not the accessory 200 requests the camera 100 for a start when the accessory 200 notifies the camera 100 of the communication request signal /WAKE. In the case where the information is 0, it means that the start is requested, and in the case where it is 1, it means that the start is not requested. D6-D0 data at address 0x0A is information indicating a factor of the communication request signal /WAKE of which the accessory 200 notifies the camera 100. FIG. 7 explains a factor number and a factor content of a communication request, and illustrates examples of factors of the communication request signal /WAKE. In this example, the accessory 200 is a microphone device. For example, a factor number 0x00 is a number indicating that a menu call switch in the operation switch 212 has been pressed. A factor number 0x01 is a number indicating that the accessory 200 has completed an output control of an audio signal. A factor number 0x02 is a number indicating that the accessory 200 has completed mute processing of the audio signal. Thus, the camera 100 can be notified of information on the generating factor of the communication request signal /WAKE.

D1 data at address 0x0C is information indicating an SPI communication protocol supported by the accessory 200, and in the case where the information is 0, it means that the accessory 200 supports SPI protocol A, and in the case where it is 1, it means that the accessory 200 supports SPI protocol B. D0 data at address 0x0C is information indicating a control logic of the CS signal in the SPI communication supported by the accessory 200. In the case where the information is 0, it means that the CS signal is a low-active logic, and in the case where it is 1, it means that the CS signal is a high-active logic. D7-D0 data at address 0x0D is information indicating the time required as a communication byte interval in the case where the accessory 200 performs communication in accordance with the SPI protocol A and the D7 data at the address 0x05 is 0 or the accessory 200 is not in the firmware update mode state. D7-D0 data at address 0x0E is information indicating the time required as a communication byte interval when the accessory 200 performs communication in accordance with the SPI protocol A and the D7 data at the address 0x05 is 1 or the accessory 200 is in the firmware update mode state.

FIGS. 8A and 8B explain communication data interval information on the SPI communication, and illustrates a relationship between information on data at the address 0x0D and data at the address 0x0E and the time (communication interval) between communication bytes. FIG. 8A illustrates the relationship between the time between communication bytes and the data at the address 0x0D, and FIG. 8B illustrates the relationship between the time between communication bytes and the data at the address 0x0E. D7-D0 data at the address 0x0F is information indicating a checksum.

Figure 9:
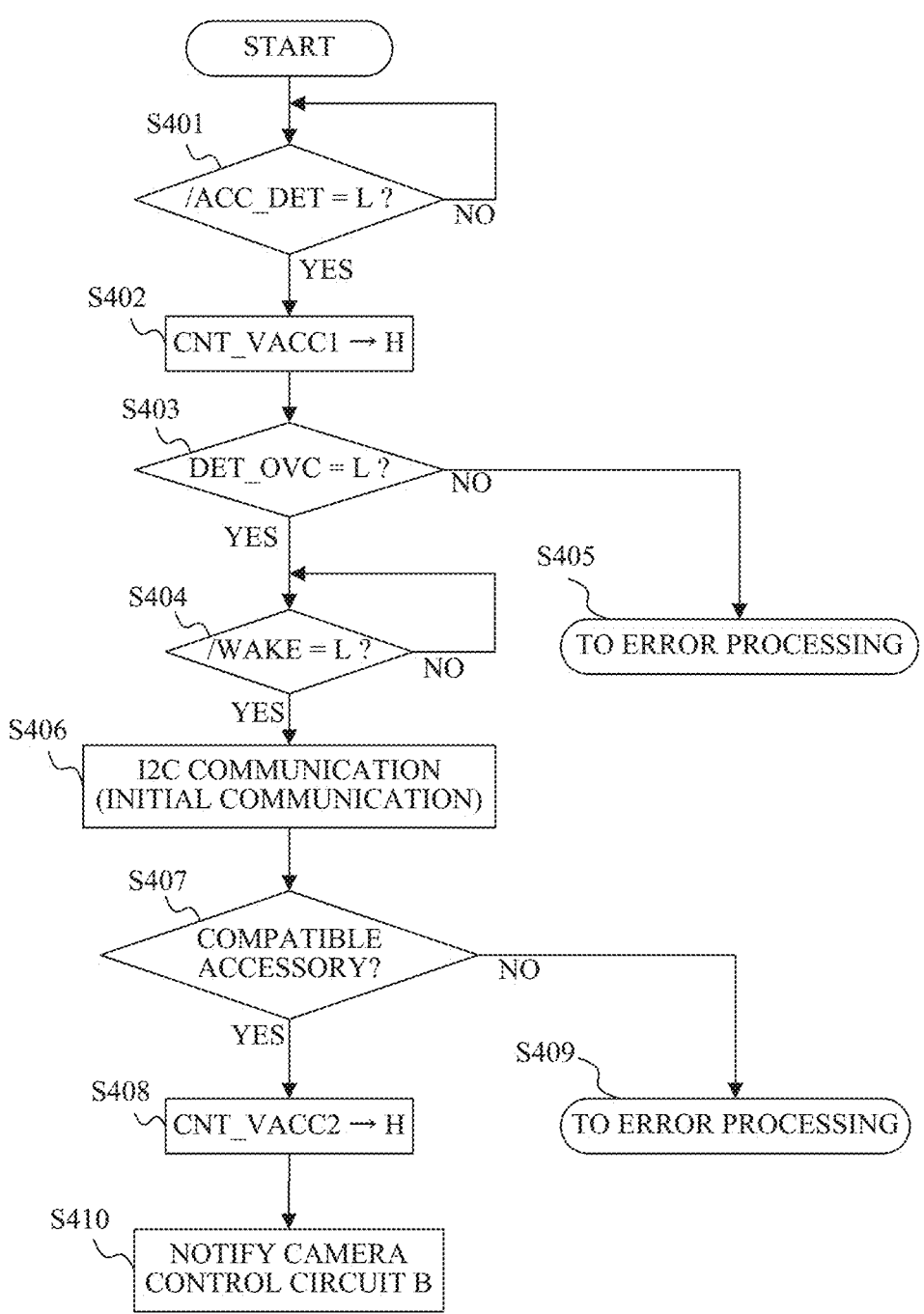
FIG. 9 is a flowchart illustrating an operation of the camera control circuit A according to the first embodiment.

FIG. 9 is a flowchart illustrating an operation of the camera control circuit A, and illustrates processing of the camera control circuit A101 from when the accessory 200 is attached to the camera 100 to when the functions of the accessory 200 are enabled.

In step S401, the camera control circuit A 101 monitors a signal level of the accessory attachment detecting signal /ACC_DET, and determines (detects) whether or not the accessory 200 is attached. In the case where the signal level of the accessory attachment detecting signal /ACC-_DET is high, the camera control circuit A 101 determines that the accessory 200 has not yet been attached and the flow returns to step S401 so as to again determines whether the accessory 200 has been attached. In the case where the signal level is low, the camera control circuit A 101 determines that the accessory 200 is attached, and the flow proceeds to step S402.

In step S402, the camera control circuit A 101 performs control for changing the power supply control signal CNT_VACC1 to a high level in order to turn on the output of the accessory power supply circuit A 131 and the flow proceeds to step S403. The accessory power supply circuit A 131 outputs the accessory power supply VACC when the power supply control signal CNT_VACC1 becomes at the high level.

In step S403, the camera control circuit A 101 monitors a signal level of the overcurrent detecting signal DET_OVC and determines whether or not an overcurrent is flowing. In the case where the signal level of DET_OVC is low, the camera control circuit A 101 determines that no overcurrent is flowing and the flow proceeds to step S404, and in the case where the signal level is high, the camera control circuit A 101 determines that the overcurrent is flowing, and the flow proceeds to step S405 to perform error processing.

In step S404, the camera control circuit A 101 monitors a signal level of the communication request signal /WAKE as a notification signal from the accessory 200, and determines whether or not an initialization of the accessory 200 has been completed. The camera control circuit A 101 determines that the initialization has been completed if the signal level of the communication request signal /WAKE is low, and the flow proceeds to step S406. If the signal level is high, the camera control circuit A 101 determines that the initialization has not yet been completed and the flow returns to step S404, so that the camera control circuit A 101 again determines whether the initialization has been completed.

In step S406, the camera control circuit A 101 performs the I2C communication with the accessory 200 and reads out 15-byte accessory information. Then, the flow proceeds to step S407. In step S407, the camera control circuit A 101 determines whether or not the attached accessory 200 is an accessory compatible with the camera 100 (compatible accessory) based on the accessory information read out in step S406. In a case where the camera control circuit A 101 determines that the attached accessory 200 is compatible, the flow proceeds to step S408, and in a case where the camera control circuit A 101 determines that the attached accessory 200 is not compatible, the flow proceeds to step S409 to perform error processing.

In step S408, the camera control circuit A 101 performs control for changing the power supply control signal CNT_VACC2 to a high level in order to turn on the output of the accessory power supply circuit B 132. Then, the flow proceeds to step S410. The accessory power supply circuit B 132 outputs the accessory power supply VACC when the power supply control signal CNT_VACC2 becomes at the high level. In this embodiment, when control is performed so as to make both the power supply control signals CNT_VACC1 and CNT_VACC2 at high levels, the output from the accessory power supply circuit B 132 is supplied to the accessory power supply VACC. In step S410, the camera control circuit A 101 notifies the camera control circuit B 102 of the accessory information read out in step S406 so as to complete the start flow of the camera 100 in response to the attachment of the accessory 200.

Figure 10:
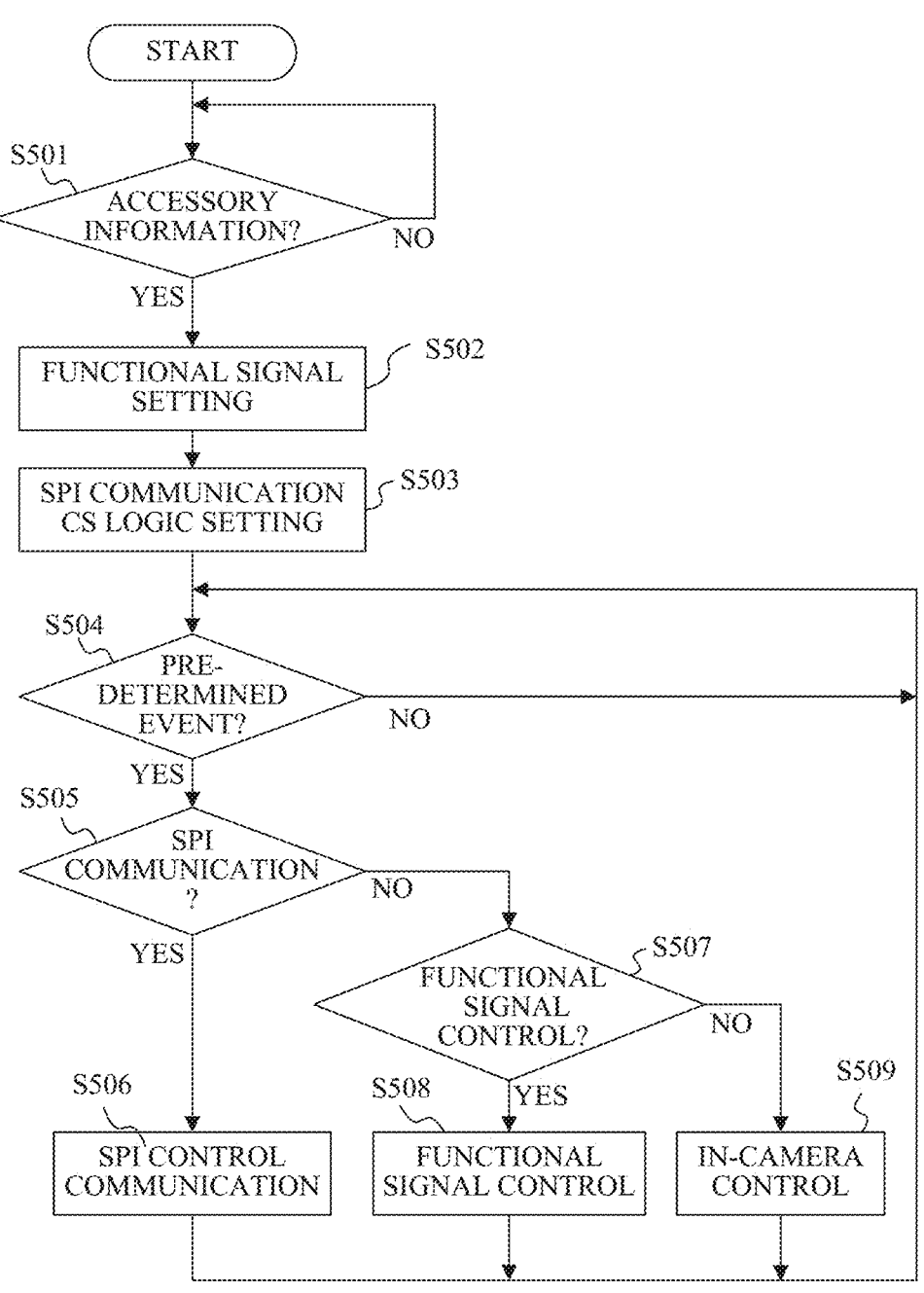
FIG. 10 is a flowchart illustrating an operation of the camera control circuit B according to the first embodiment.

FIG. 10 is a flowchart of an operation of the camera control circuit B 102 from when the accessory 200 is attached to the camera 100 to when the functions of the accessory 200 are enabled.

In step S501, the camera control circuit B 102 determines whether or not the accessory information has been notified from the camera control circuit A 101. If the accessory information has not yet been notified, the flow returns to step S501 and the camera control circuit B 102 again determines whether or not the accessory information has been notified (performs a detection operation). If the accessory information has been notified, the flow proceeds to step S502.

In step S502, the camera control circuit B 102 sets the functional signals FNC1 to FNC4 based on the accessory information notified from the camera control circuit A 101. For example, in the case where it is notified that the accessory 200 is a microphone device, FNC1 is set to function as voice data clock signal BCLK, FNC2 is set to function as voice data channel signal LRCLK, and FNC3 is set to function as voice data signal SDAT. As another example, in the case where it is notified that the accessory 200 is a strobe device, FNC 4 is set to function as strobe emission synchronization signal XOUT. For functional signals that do not require control over the accessory 200, the camera control circuit B 102 makes predetermined settings so as not to interfere with operations of the camera 100 and the accessory 200.

Next, in step S503, the camera control circuit B 102 sets the CS control logic in step SPI communication based on the accessory information notified from the camera control circuit A 101. Next, in step S504, the camera control circuit B 102 determines (detects) whether or not a predetermined event for the accessory 200 has occurred. If no event has occurred, the flow returns to step S504 and the camera control circuit B 102 again determines (detects) whether or not the event has occurred. If the event has occurred, the flow proceeds to step S505.

In step S505, the camera control circuit B 102 determines whether the event determined in step S504 is an event that requires the SPI communication with the accessory 200. The flow proceeds to step S506 if the detected event is the event that requires the SPI communication. The flow proceeds to step S507 if the detected event is not the event that requires the SPI communication.

In step S507, the camera control circuit B 102 determines whether or not the event determined in step S504 is an event that requires control over the accessory 200 using the functional signal. The flow proceeds to step S508 if the detected event is the event that requires the control using the functional signal, and the flow proceeds to step S509 if the detected event is not the event that requires the control using the functional signal.

In step S506, the camera control circuit B 102 performs the SPI communication with the accessory 200. The SPI communication performed in step S506 includes, for example, communication of an instruction to turn on or off the microphone operation, communication of an instruction to switch a sound collection directivity of the microphone, communication of an instruction to switch an equalizer function of the microphone, and the like in the case where the accessory 200 is a microphone device. In the case where the accessory 200 is a strobe device, the SPI communication includes communication for reading out setting information on the strobe device, communication for notifying the strobe device of the setting information, and the like. In the case where the SPI communication in step S506 is completed, the flow returns to step S504 and the camera control circuit B 102 again determines whether or not the event has occurred.

In step S508, the camera control circuit B 102 controls the accessory 200 using a functional signal. For example, in the case where the accessory 200 is a microphone device, the camera control circuit B 102 outputs the audio data clock signal BCLK of FNC1 and the audio data channel signal LRCLK of FNC2, and takes in the audio data signal SDAT of FNC3. Thereby, the camera 100 can acquire voice data from the accessory 200. In the case where the accessory 200 is a strobe device, the camera control circuit B 102 controls the strobe emission synchronization signal XOUT of FNC 4 at a predetermined timing. Thereby, the camera 100 can instruct the strobe device on a light emission. In a case where the control using the predetermined functional signal is completed in step S508, the flow returns to step S504 and the camera control circuit B 102 again detects whether or not the event has occurred.

In step S509, the camera control circuit B 102 performs predetermined in-camera control according to the event detected in step S504. The in-camera control executed by step S509 includes, for example, control for starting or ending recording of voice data in the recording memory 126, control for performing equalizer processing for the voice data, and the like, in the case where the accessory 200 is a microphone device. In the case where the accessory 200 is a strobe device, the in-camera control includes photometric control for accumulating and acquiring light emitted by the strobe device using the image sensor 122, control for calculating an indicated value of a light emission amount of the strobe device, and the like. In a case where the in-camera control is thus completed in step S509, the flow returns to step S504 and the camera control circuit B 102 again detects whether or not the event has occurred.

As described above, the camera 100 can control the attached accessory 200 in accordance with the flowcharts of FIGS. 9 and 10.

Figure 11:
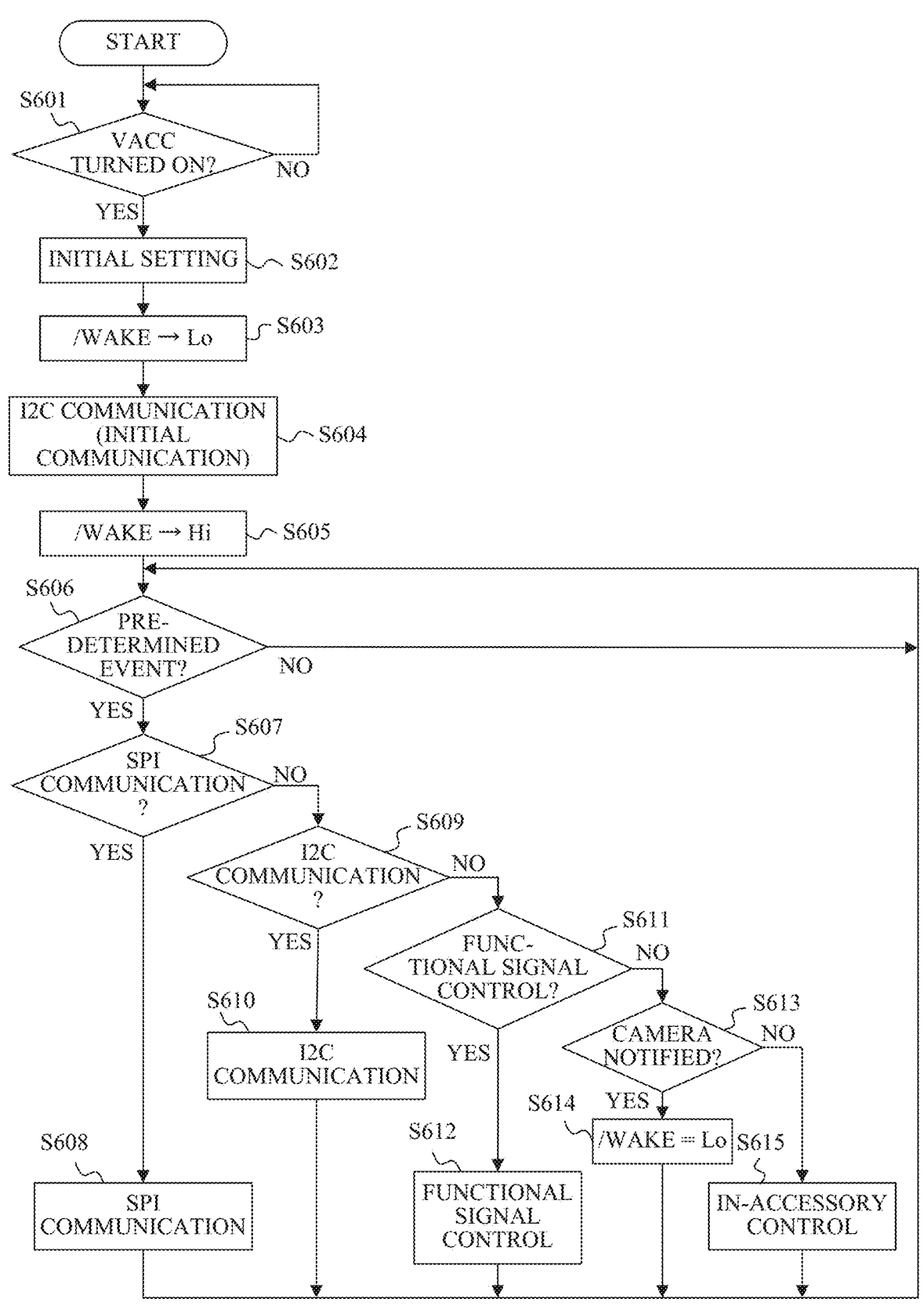
FIG. 11 is a flowchart illustrating the operation of the accessory control circuit according to the first embodiment.

FIG. 11 is a flowchart illustrating an operation of the accessory control circuit 201, and illustrates processing of the accessory control circuit 201 from when the accessory 200 is attached to the camera 100 to when the functions of the accessory 200 are operated.

In step S601, the accessory control circuit 201 waits for the accessory power supply VACC from the camera 100 to be turned on. In the case where the accessory 200 has no battery 205, turning on of the accessory power supply VACC is detectable when power is supplied to the accessory control circuit 201 and the operation of the accessory control circuit 201 itself is started. In the case where the accessory 200 has the battery 205, the accessory control circuit 201 can detect that the accessory power supply VACC is turned on even when the accessory control circuit 201 monitor the voltage value of the accessory power supply VACC in addition to the above functions. In the case where the accessory power supply VACC is turned on, the flow proceeds to step S602.

In step S602, the accessory control circuit 201 makes a predetermined initial setting. For example, the accessory control circuit 201 sets an operating frequency of the microcomputer, an input/output control port of the microcomputer, initialization of a timer function of the microcomputer, and initialization of an interrupt function of the microcomputer. When the initial setting in step S602 is completed, the flow proceeds to step S603. In step S603, the accessory control circuit 201 performs control for changing the communication request signal /WAKE to a low output and the camera 100 is notified that the initial setting is completed.

Next, in step S604, the accessory control circuit 201 responds to the I2C communication from the camera 100 and transmits 15-byte accessory information. The accessory information includes various information illustrated in FIG. 4, as described above. When the initial communication of S604 is completed, the flow proceeds to step S605. In step S605, the accessory control circuit 201 performs control for changing the communication request signal /WAKE to a high level. In a case where the initial communication is completed, the flow proceeds to step S606. In step S606, the accessory control circuit 201 determines (detects) whether or not a predetermined event has occurred. If no event has occurred, the flow returns to step S606 and the accessory control circuit 201 again determines (detects) whether or not the event has occurred, and if the event has occurred, the flow proceeds to step S607.

In step S607, the accessory control circuit 201 determines whether or not the event determined in step S606 is an event that requires the SPI communication with the camera 100. The flow proceeds to step S608 if the detected event is the event that requires the SPI communication, and the flow proceeds to step S609 if the detected event is not the event that requires the SPI communication.

In step S609, the accessory control circuit 201 determines whether or not the event determined in step S606 is an event that requires I2C communication with the camera 100. The flow proceeds to step S610 if the detected event is the event that requires the I2C communication, and the flow proceeds to step S611 if the detected event is not the event that requires the I2C communication.

In step S611, the accessory control circuit 201 determines whether or not the event detected in step S606 is an event that requires control using a functional signal. The flow proceeds to step S612 if the detected event is the event that requires the control using the functional signal, and the flow proceeds to step S613 if the detected event is not the event that requires the control using the functional signal.

In step S613, the accessory control circuit 201 determines whether or not the event detected in step S606 is an event that notifies the camera 100 by the communication request signal /WAKE. The flow proceeds to step S614 if the detected event is the event that notifies the camera 100 by the communication request signal /WAKE, and the flow proceeds to step S615 if the detected event is not the event that notifies the camera 100 by the communication request signal /WAKE.

In step S608, the accessory control circuit 201 performs the SPI communication with the camera 100. In the case where the communication request signal /WAKE is at a low output state when the accessory control circuit 201 executes the SPI communication, the accessory control circuit 201 performs control for changing the communication request signal /WAKE to a high output state after the SPI communication. The SPI communication includes, for example, communication of an instruction to turn on a microphone operation from the camera 100, communication of an instruction to turn off the microphone operation, and communication of an instruction to switch a sound collection directivity of the microphone, in the case where the accessory 200 is a microphone device. The SPI communication further includes communication of an instruction to switch an equalizer function of the microphone. In the case where the accessory 200 is a strobe device, the SPI communication includes communication for reading out setting information on the strobe device, communication for notifying the strobe device of the setting information, and the like. When the predetermined SPI communication in step S608 is completed, the flow returns to step S606 and the accessory control circuit 201 again detects whether or not the event has occurred.

In step S610, the accessory control circuit 201 performs the I2C communication with the camera 100. In the case where the communication request signal /WAKE is at a low output state when the SPI communication is executed, control for changing the communication request signal /WAKE into a high output state is performed after the I2C communication. The I2C communication executed in step S610 includes, for example, communication for reading out a communication request factor for the signal notification of the communication request signal /WAKE of which the accessory control circuit 201 has notified the camera 100. When the predetermined I2C communication in step S610 is completed, the flow returns to step S606 and the accessory control circuit 201 again detects whether or not the event has occurred.

In step S612, the accessory control circuit 201 controls the camera 100 using a functional signal. The control includes, for example, reception control of the audio data clock signal BCLK of FNC1 and the audio data channel signal LRCLK of FNC2 output from the camera 100, in the case where the accessory 200 is a microphone device, and output control of the voice data signal SDAT of FNC3 in synchronization with these signals. In the case where the accessory 200 is a strobe device, the control includes reception control of the strobe emission synchronization signal XOUT of FNC4 for strobe emission control. In a case where the control using the functional signal in step S612 is completed, the flow returns to step S606 and the accessory control circuit 201 again detects whether or not the event has occurred.

In step S614, the accessory control circuit 201 stores a communication request factor number to the camera 100 in response to the event determined in step S606 in an unillustrated volatile memory of the accessory 200, and performs control for changing the communication request signal /WAKE to a low output. The communication request factor number is a unique number assigned to each factor content as explained with reference to FIG. 7. In a case where the low output control of the communication request signal /WAKE in step S614 is completed, the flow returns to step S606 and the accessory control circuit 201 again determines whether the event has occurred.

In step S615, the accessory control circuit 201 performs in-accessory control according to the event determined in step S606. The in-accessory control executed in step S615 includes, for example, detecting control of a remaining battery level, detecting control of an operation of the operation switch 212, and the like, in the case where the accessory 200 includes the battery 205. In a case where the in-accessory control in step S615 is completed, the flow returns to step S606 and the accessory control circuit 201 again detects whether the event has occurred.

In accordance with the flowchart of FIG. 11, the accessory 200 can perform functional operations after the accessory 200 is attached to the camera 100.

Second Embodiment

Figure 12:
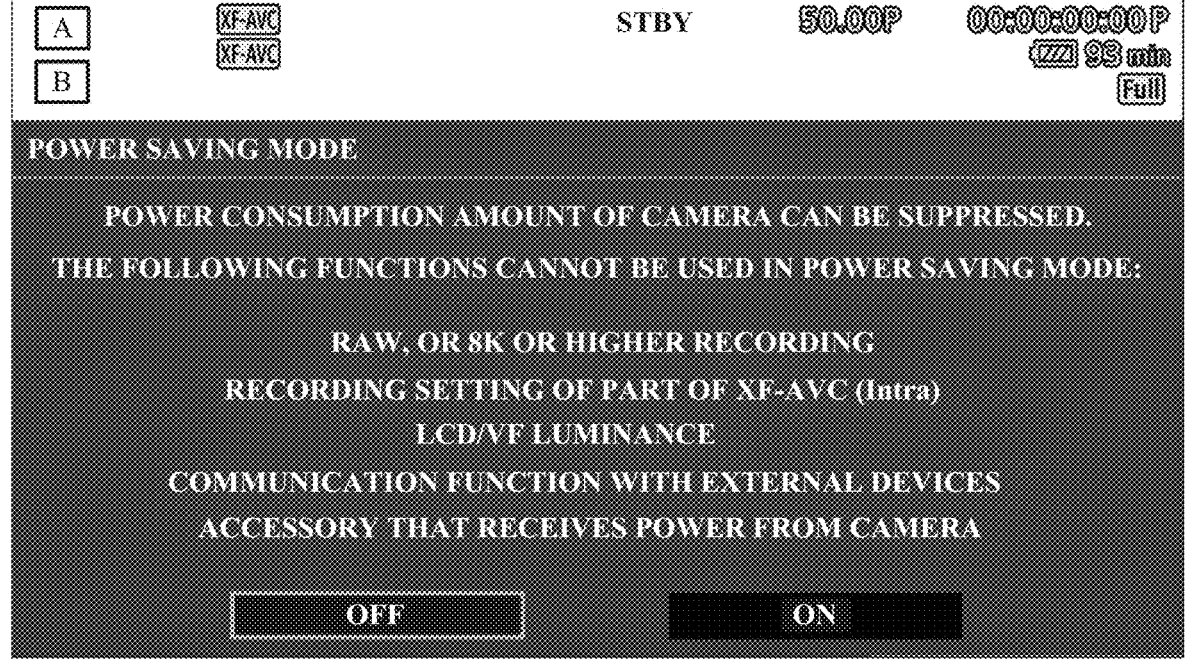
FIG. 12 illustrates an example of a setting screen for a power saving mode in a camera according to a second embodiment.

A description will now be given of a second embodiment of the present disclosure. Referring now to FIG. 12, a description will be given of a power saving mode in the camera 100 according to this embodiment. FIG. 12 is an example of a setting screen (image) for turning on and off a power saving mode displayed on the camera 100. The power saving mode is a second mode in which power consumption is lower than that of the first mode (normal mode). In other words, the first mode is a mode in which power consumption of the camera 100 is not limited, and the second mode is a mode in which power consumption is limited.

In this embodiment, the power saving mode is a function that lowers the lower limit voltage of the battery 111 and increases the operating time of the camera 100 with the battery 111 by limiting functions of the camera 100 that consume a large amount of power. As illustrated in FIG. 12, functions with high power consumption include RAW recording, 8K recording, LCD/VF luminance, a communication function with external devices, and an accessory that receives power from the camera, but are not limited to them.

This embodiment discusses a method of turning on and off the power saving mode through a screen (to switch between the normal mode and the power saving mode), but turning on and off of the power saving mode may be switched according to the type of battery 111. For example, in a case where the battery 111 has a low power supply capability, the power saving mode can be turned on, and in a case where the battery 111 has a power supply capacity above a certain level, the power saving mode can be turned off.

Figure 13A:
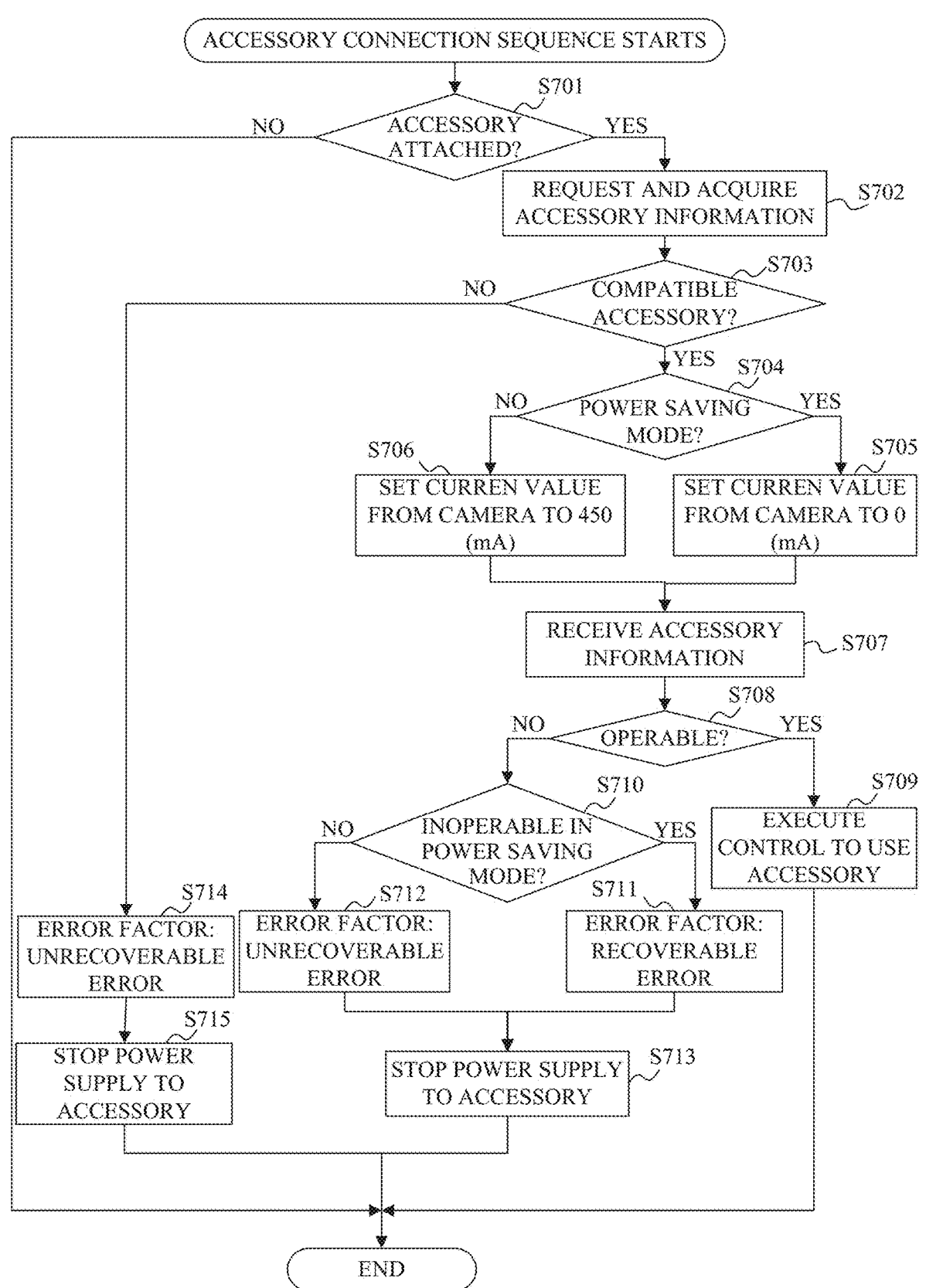
FIG. 13A is a flowchart illustrating the operation of the camera according to the second embodiment.

Referring now to FIG. 13, a description will be given of accessory control in the power saving mode in the camera 100. FIG. 13A is a flowchart illustrating the operation of the camera 100, and a method of controlling the camera 100 in a case where the accessory 200 is attached in the power saving mode.

First, in step S701, the camera 100 (camera control circuit A or B as a control unit) determines whether the accessory 200 is attached. In a case where it is determined that the accessory 200 is attached to the camera 100, the flow proceeds to step S702. On the other hand, in a case where it is determined that the accessory 200 is not attached to the camera 100, this flow ends.

In step S702, the camera 100 issues an information acquiring request to the accessory 200, and acquires information from the accessory 200. Next, in step S703, the camera 100 determines whether the attached accessory 200 is a compatible accessory. In a case where it is determined that the accessory 200 is a compatible accessory, the flow proceeds to step S704. On the other hand, in a case where it is determined that the accessory 200 is not a compatible accessory, the flow proceeds to step S714.

In step S704, the camera 100 determines whether the state of the camera 100 is in the power saving mode (whether the camera 100 is set to the power saving mode). In a case where it is determined that the camera 100 is set to the power saving mode, the flow proceeds to step S705. On the other hand, in a case where it is determined that the camera 100 is not set to the power saving mode, the flow proceeds to step S706. In this embodiment, the normal mode and the power saving mode can be switched by the user operation.

In step S705, the camera 100 sets a threshold of a current value that can be supplied from the camera 100 to the accessory 200 to 0 (mA). After the setting is completed, the flow proceeds to step S707. In step S706, the camera 100 sets the threshold of the current value that can be supplied from the camera 100 to the accessory 200 to 450 (mA). After the setting is completed, the flow proceeds to step S707.

In step S707, the camera 100 acquires (receives) information about the accessory 200 illustrated in FIG. 4 from the accessory 200 in order to determine whether the accessory 200 is operable. Next, in step S708, the camera 100 determines whether the accessory 200 is operable based on the information about the accessory 200 acquired in step S707. For example, in a case where the accessory 200 is in a self-powered operating state (second state), the camera 100 determines that the accessory 200 is operable, and the flow proceeds to step S709. On the other hand, for example, in a case where the accessory 200 is in a bus-powered operating state (first state), the camera 100 compares the threshold set in step S705 or S706 and the required power D7-0 at address 0x04 in FIG. 4 acquired in step S707. In a case where it is determined that the electric power is sufficient based on the comparison result, the flow proceeds to step S709. On the other hand, in a case where it is determined that the power is insufficient, the flow proceeds to step S710. Thus, the camera 100 can determine whether it is in the first state or the second state according to the information received from the accessory 200.

Here, the self-powered state (second state) is a state in which the accessory 200 is powered by a battery attached to the accessory 200 or a dedicated AC adapter (the accessory 200 is powered without using power from the camera 100).

On the other hand, the bus-powered operating state (first state) is a state in which the accessory 200 is powered by the camera 100.

In this embodiment, the comparison of the required power is used as an example to determine whether the power is sufficient, but the determination can be made based on information indicating whether the accessory 200 is self-powered or bus-powered. The determination of self-power or bus power may be made using D3-2 at address 0x03 in FIG. 4, or may be made based on the accessory switch information received from the accessory 200.

In step S709, the camera 100 performs control to use the accessory 200, and this flow ends. In step S710, the camera 100 determines whether the reason why the accessory 200 cannot be used is that the camera 100 is in the power saving mode and the bus power is insufficient for power of the accessory 200. In a case where it is determined that this is the cause, the flow proceeds to step S711. On the other hand, in a case where it is determined that this is not the cause, the flow proceeds to step S712.

In step S711, the camera 100 sets a recoverable error as a cause for stopping power supply to the accessory 200. In a case where the recoverable error is set, the camera 100 can resume power supply to the accessory 200 if it determines that a specific condition is met. After the setting of the recoverable error is completed, the flow proceeds to step S713. The specific condition will be described below with reference to FIG. 13B.

In step S712, the camera 100 sets an unrecoverable error as a cause for stopping power supply to the accessory 200. In a case where the unrecoverable error is set, the power is not supplied to the accessory 200 even if the specific condition is met. After the setting of the unrecoverable error is completed, the flow proceeds to step S713. In step S713, the camera 100 stops power supply to the accessory 200. After the process of stopping the power supply to the accessory 200 is completed, this flow ends.

In step S714, the camera 100 sets the unrecoverable error as the cause for stopping power supply to the accessory 200. Next, in step S715, the camera 100 stops power supply to the accessory 200. After the processing of stopping the power supply to the accessory 200 is completed, this flow ends.

Figure 13B:
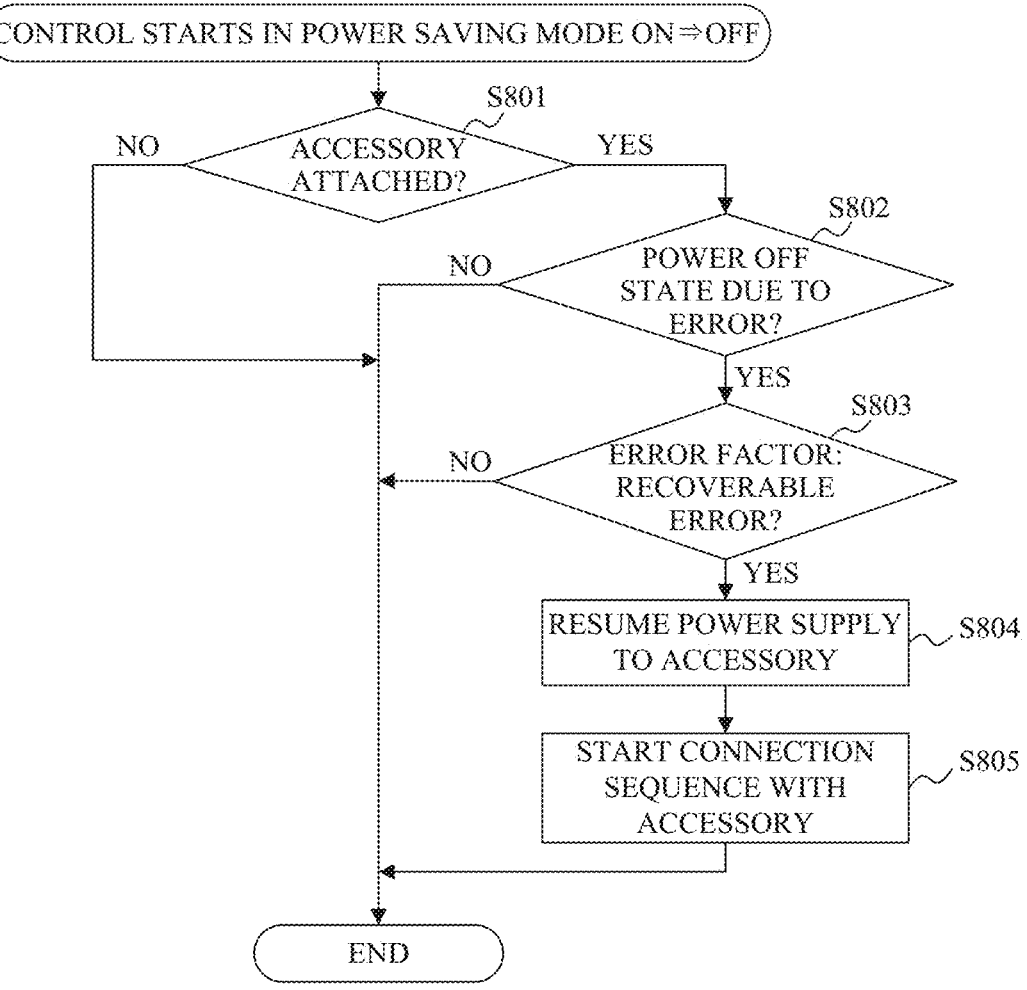
FIG. 13B is a flowchart illustrating the operation of the camera according to the second embodiment.

Referring now to FIG. 13B, a description will be given of accessory control in a case where the camera 100 transitions from the power saving mode to the normal mode. FIG. 13B is a flowchart illustrating the operation of the camera 100 in a case where the camera 100 transitions from the power saving mode to the normal mode.

First, in step S801, the camera 100 determines whether the accessory 200 is attached. In a case where it is determined that the accessory 200 is attached, the flow proceeds to step S802. On the other hand, in a case where it is determined that the accessory 200 is not attached, this flow ends.

In step S802, the camera 100 determines whether the accessory 200 is in a state where the power supply has been stopped by the processing in step S713 or S715 in FIG. 13A (whether the power supply is turned off due to an error). In a case where it is determined that the power supply has been stopped due to the above processing, the flow proceeds to step S803. On the other hand, in a case where it is determined that the power supply is not stopped due to the above processing, this flow ends.

In step S803, the camera 100 determines whether the cause of stopping the power supply to the accessory 200 is a recoverable error set in step S711 of FIG. 13A. In a case where it is determined that the cause is the recoverable error, the flow proceeds to step S804. On the other hand, in a case where it is determined that the cause is a unrecoverable error, this flow ends.

Thus, the camera 100 does not resume the power supply to the accessory 200 in a case where the accessory 200 is in the first state and the power supply to the accessory 200 is stopped except for a case where the camera 100 is set to the second mode, even if it is determined that a specific condition is met.

In step S804, the camera 100 resumes power supply to the accessory 200. Next, in step S805, the camera 100 performs the connection sequence again with the accessory 200, and transitions to a state where the accessory 200 can be used. After the connection sequence is completed, this flow ends.

This embodiment transitions the accessory 200 to a reusable state in a case where the camera 100 transitions from the power saving mode to the normal mode, which is a case where the specific condition for transitioning the accessory 200 to the reusable state is satisfied. However, this embodiment is not limited to this example. The specific condition may be that a certain period of time has passed since the power supply to the accessory 200 was stopped (after stopping the power supply was started), or that a user operation to resume the power supply to the accessory 200 is performed.

In this embodiment, the power supply is stopped in a case where it is determined that a specific condition is met, but the present disclosure is not limited to this embodiment. Processing may be performed to limit power supply in a case where it is determined that a specific condition is met. The limitation on the power supply herein includes not only to stop power supply from the camera 100 to the accessory 200, but also to supply power that consumes less power than that of the normal power supply from the camera 100 to the accessory 200.

This embodiment resumes the power supply to the accessory 200 in step S804 regardless of whether the state of the accessory 200 is in the first state or the second state, but in step S804, it may be determined whether to resume the power supply based on the state of the accessory 200. For example, in a case where the accessory 200 is in the second state, it is unnecessary to resume the power supply to the accessory 200. In such a configuration, if it is also assumed that the state of the accessory 200 changes after the camera 100 transitions to the power saving mode, the processing similar to step S707 may be performed after the camera 100 transitions from the power saving mode to the normal mode and the flow may proceed to step S804.

In this embodiment, the camera 100 supplies power to the accessory 200, but an intermediate accessory attached to the camera 100 and the accessory 200 and switchable between the power saving mode and the normal mode may supply power to the accessory 200. In such a configuration, the intermediate accessory may perform the processing relating to power supply to the accessory 200 that was executed by the camera 100 in this embodiment.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can provide an image pickup apparatus that can improve user convenience while preventing system failure due to power shortage.

This application claims priority to Japanese Patent Application No. 2023-085561, which was filed on May 24, 2023, and which is hereby incorporated by reference herein in its entirety.

What is claimed is:

1. An image pickup apparatus attachable to and detachable from an accessory and configured to set a first mode, and a second mode that consumes power less than that of the first mode, the image pickup apparatus comprising:

a memory storing instructions; and a processor configured to execute the instructions to:

control the accessory by communicating with the accessory, limit power supply to the accessory in a case where the accessory is in a first state in which the accessory is operated by the power supplied from the image pickup apparatus and the image pickup apparatus is set to the second mode, and lift a limitation on the power supply to the accessory in a case where the processor determines that a specific condition is satisfied, wherein the accessory is set to either the first state or a second state that is different from the first state, wherein in a case where the image pickup apparatus is set to the second mode, the processor is configured to control the power supply to the accessory differently depending on whether the accessory is in the first state or in the second state.

2. The image pickup apparatus according to claim 1, wherein the processor is configured to:

stop the power supply to the accessory in a case where the image pickup apparatus is set to the second mode in the first state, and resume the power supply to the accessory in a case where it is determined that the specific condition is satisfied.

3. The image pickup apparatus according to claim 1, wherein the processor is configured to determine whether the accessory is in the first state or the second state in which the accessory is operated without using the power supplied from the image pickup apparatus.

4. The image pickup apparatus according to claim 3, wherein the processor is configured to determine whether the accessory is in the first state or the second state, according to information received from the accessory.

5. The image pickup apparatus according to claim 1, wherein the first mode is a mode in which power consumption of the image pickup apparatus is not limited, and the second mode is a mode in which the power consumption of the image pickup apparatus is limited.

6. The image pickup apparatus according to claim 1, wherein the processor is configured not to lift the limitation on the power supply to the accessory in a case where the processor determines that the specific condition is not satisfied.

7. The image pickup apparatus according to claim 1, wherein the specific condition is that the image pickup apparatus has transitioned from the second mode to the first mode.

8. The image pickup apparatus according to claim 1, wherein the specific condition is that a user operation has been made to lift the limitation on the power supply to the accessory.

9. The image pickup apparatus according to claim 1, wherein the specific condition is that a predetermined period has elapsed since the limitation on the power supply to the accessory was started.

10. The image pickup apparatus according to claim 1, wherein user operation can switch the image pickup apparatus between the first mode and the second mode.

11. The image pickup apparatus according to claim 1, wherein the image pickup apparatus is switchable between the first mode and the second mode according to a type of a power source for the image pickup apparatus.

12. The image pickup apparatus according to claim 1, wherein the processor does not lift the limitation on the power supply to the accessory in a case where the processor limits the power supply to the accessory in the first state except for a case where the image pickup apparatus is set to the second mode, even if it is determined that the specific condition is satisfied.

13. A method for controlling an image pickup apparatus attachable to and detachable from an accessory and configured to set a first mode, and a second mode that consumes power less than the first mode, the method comprising the steps of:

a communication step of communicating with the accessory;

a control step of controlling the accessory through a communication by:

limiting power supply to the accessory in a case where the accessory is in a first state in which the accessory is operated by the power supplied from the image pickup apparatus and the image pickup apparatus is set to the second mode, and lifting a limitation on the power supply to the accessory in a case where the processor determines that a specific condition is satisfied, wherein the accessory is set to either the first or second states, different from the first state, wherein, in a case where the image pickup apparatus is set to the second mode, the processor is configured to control the power supply to the accessory differently depending on whether the accessory is in the first state or in the second state.

14. A non-transitory computer-readable storage medium storing a program that causes a computer to execute the method according to claim 13.

\* \* \* \* \*